(12) United States Patent
Lee

(10) Patent No.: US 10,114,813 B2
(45) Date of Patent: Oct. 30, 2018

(54) MOBILE TERMINAL AND CONTROL METHOD THEREOF

(71) Applicant: LG ELECTRONICS INC., Seoul (KR)

(72) Inventor: Seungshin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 556 days.

(21) Appl. No.: 14/593,529

(22) Filed: Jan. 9, 2015

(65) Prior Publication Data

US 2016/0140108 A1  May 19, 2016

(30) Foreign Application Priority Data

Nov. 13, 2014 (KR) .................. 10-2014-0157820

(51) Int. Cl.
| G06F 17/30 | (2006.01) |
| G06F 17/27 | (2006.01) |
| G06F 3/0484 | (2013.01) |
| G10L 15/22 | (2006.01) |
| G10L 13/00 | (2006.01) |

(52) U.S. Cl.
CPC ...... G06F 17/2765 (2013.01); G06F 3/04842 (2013.01); G10L 15/22 (2013.01); G10L 13/00 (2013.01); G10L 2015/221 (2013.01); G10L 2015/228 (2013.01)

(58) Field of Classification Search
CPC . G06F 17/2765; G06F 3/04842; G10L 15/22; G10L 13/00; G10L 2015/221; G10L 2015/228
See application file for complete search history.

(56) References Cited

U.S. PATENT DOCUMENTS

| 7,027,987 B1* | 4/2006 | Franz ...................... G10L 15/22 704/236 |
| 2008/0097984 A1 | 4/2008 | Candelore |
| 2009/0097753 A1* | 4/2009 | Millington ............ G06F 3/0233 382/187 |
| 2011/0004477 A1 | 1/2011 | Bansal et al. |
| 2011/0208524 A1* | 8/2011 | Haughay ................ G10L 15/22 704/246 |
| 2012/0313849 A1* | 12/2012 | Bak ......................... G10L 15/08 345/156 |
| 2013/0275134 A1 | 10/2013 | Horrii et al. |
| 2014/0195243 A1* | 7/2014 | Cha ......................... G06F 3/167 704/270.1 |
| 2016/0098611 A1* | 4/2016 | Gray .................... G06K 9/2054 382/229 |

FOREIGN PATENT DOCUMENTS

| CN | 102866824 A | 1/2013 |
| CN | 103329196 A | 9/2013 |
| CN | 103916708 A | 7/2014 |

* cited by examiner

Primary Examiner — Etienne Leroux
Assistant Examiner — Husam T Samara
(74) Attorney, Agent, or Firm — Dentons US LLP

(57) ABSTRACT

A display device is disclosed. The display device comprises a display unit, a sound sensing unit receiving a user's voice, a database storing text displayed on the display unit for a predetermined time period, and a controller extracting from the database at least one text corresponding to a user's voice received within a predetermined time period.

17 Claims, 19 Drawing Sheets

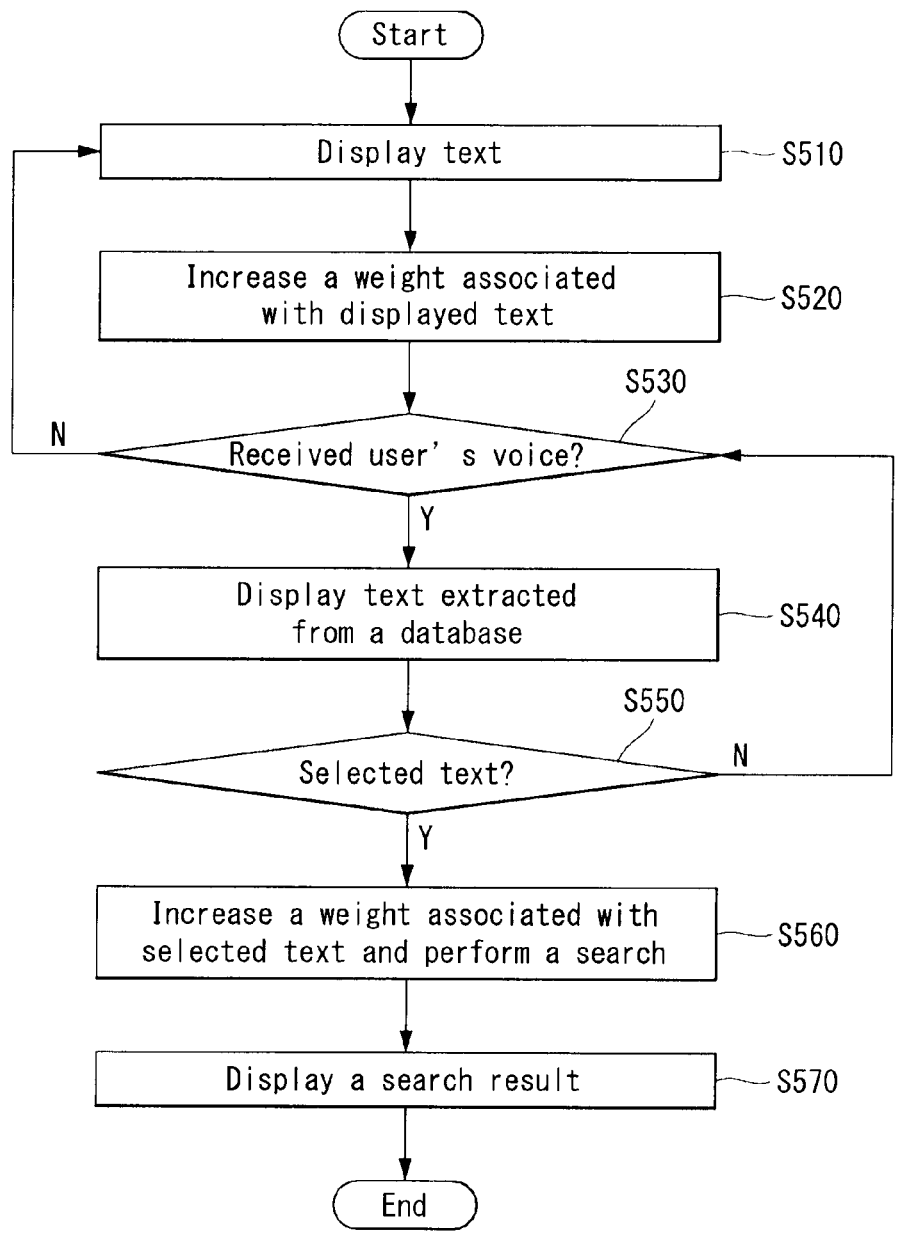

FIG. 7
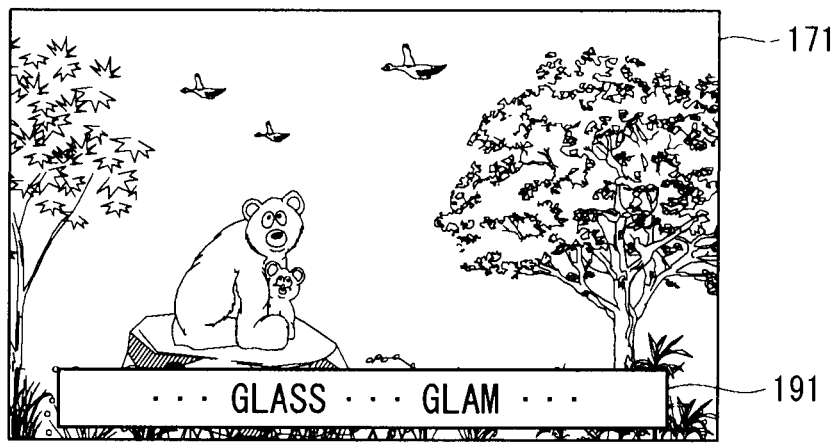
| Text | GLAM | GLAD | GLASS | GRADE | ··· |
|---|---|---|---|---|---|
| Weight | 5 | 4 | 4 | 1 | ··· |
FIG. 8
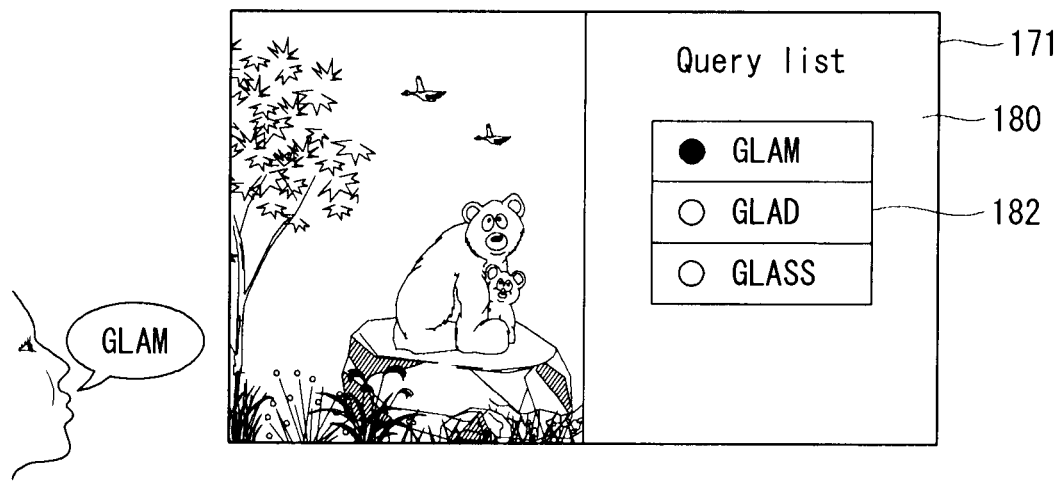

FIG. 9
FIG. 10
| Text | GLAM | GLAD | GLASS | GRADE | ... |
|---|---|---|---|---|---|
| Weight | 7 | 4 | 4 | 1 | ... |
FIG. 11
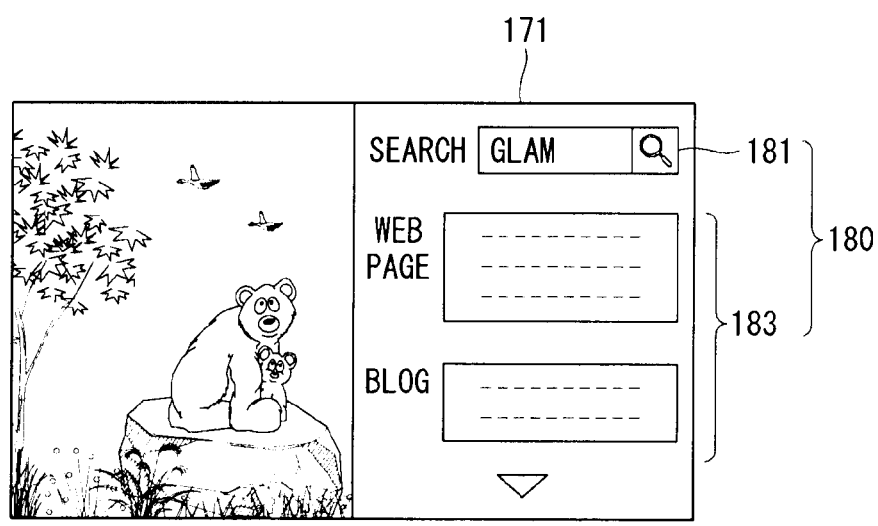

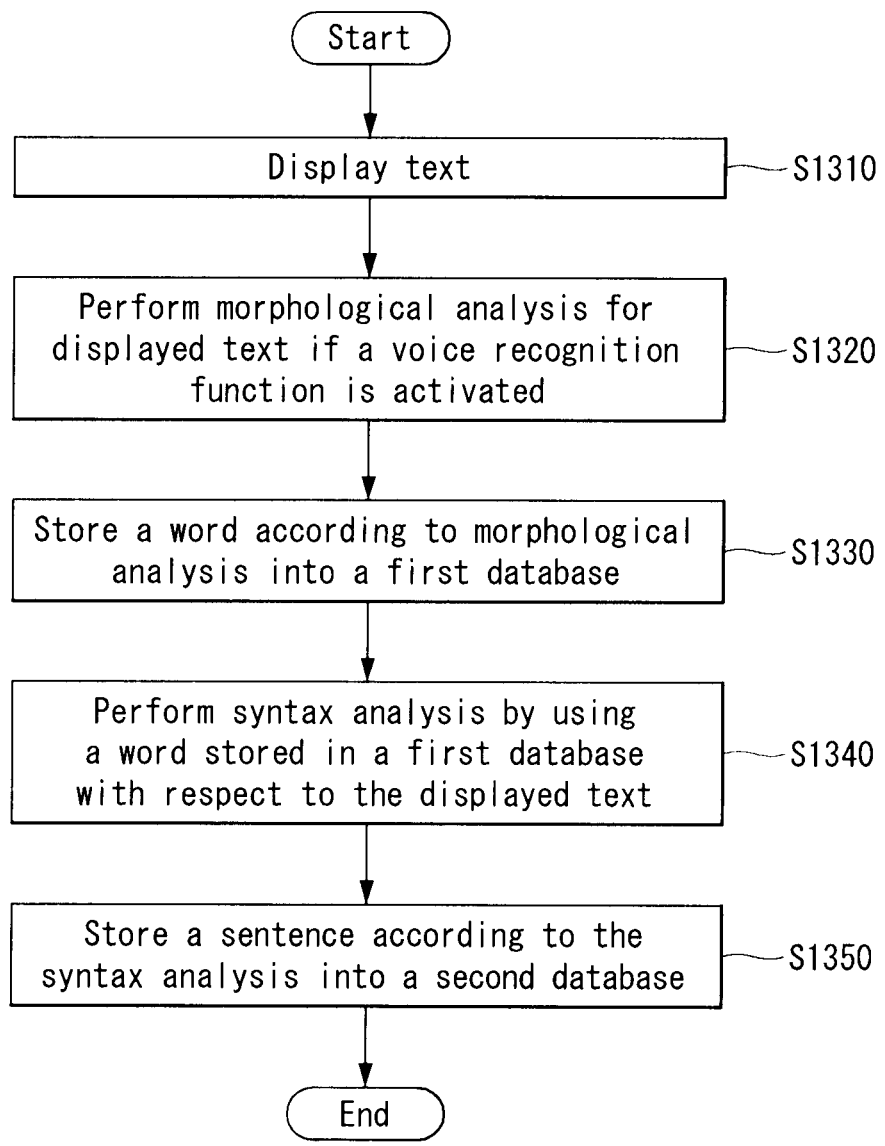

FIG. 14
| 1st DB | Text | GLAD | ... |
|---|---|---|---|
| | Weight | 4 | ... |
| 2nd DB | Text | GLAD TO SEE YOU | ... |
|---|---|---|---|
| | Weight | 1 | ... |
FIG. 15
| 1st DB | Text | GLAD | ... |
|---|---|---|---|
| | Weight | 6 | ... |
| 2nd DB | Text | GLAD TO SEE YOU | ... |
|---|---|---|---|
| | Weight | 1 | ... |
FIG. 16
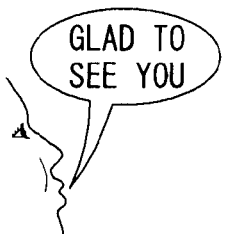
| 1st DB | Text | GLAD | ... |
|---|---|---|---|
| | Weight | 6 | ... |
| 2nd DB | Text | GLAD TO SEE YOU | ... |
|---|---|---|---|
| | Weight | 3 | ... |

| Text | CODE | | | | | Matching score [%] |
|---|---|---|---|---|---|---|
| GLAD | G | L | A | D | - | 100 |
|  | 0X67 | 0X6C | 0X61 | 0X64 | | |
| GLAM | G | L | A | M | - | 80 |
|  | 0X67 | 0X6C | 0X61 | 0X6D | | |
| GLASS | G | L | A | S | S | 65 |
|  | 0X67 | 0X6C | 0X61 | 0X73 | 0X73 | |
| GRADE | G | R | A | D | E | 32 |
|  | 0X67 | 0X72 | 0X61 | 0X64 | 0X65 | |

| Voice recognition server | 100 X 1 = 100 |
|---|---|
| Database | 100 X 0 = 0 |

| Text | GLAD |
|---|---|
| Weight | 2 |

| Voice recognition server | 100 X 1 = 100 |
|---|---|
| Database | 100 X 2 = 200 |

FIG. 23
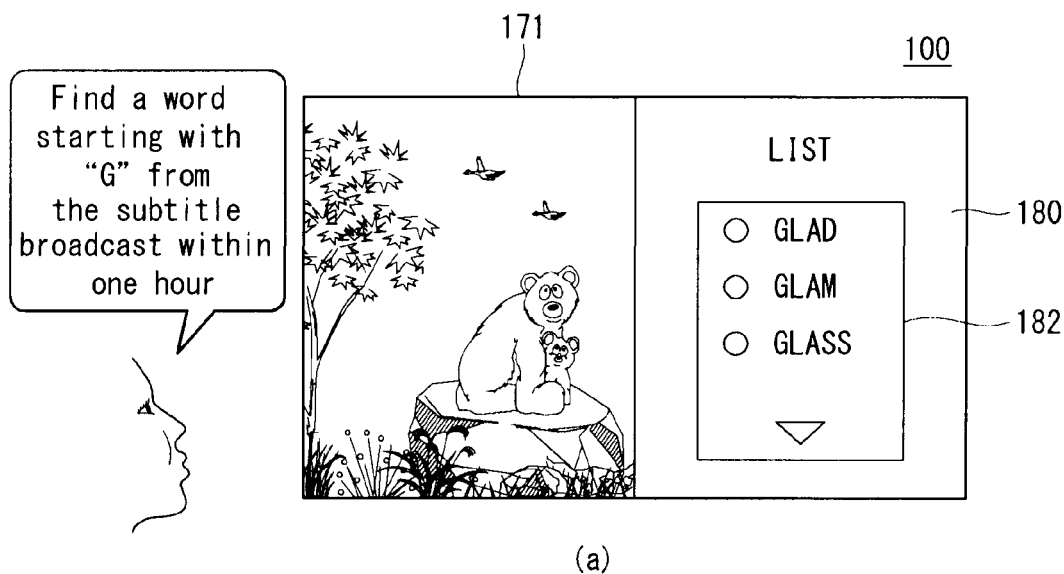
(a)
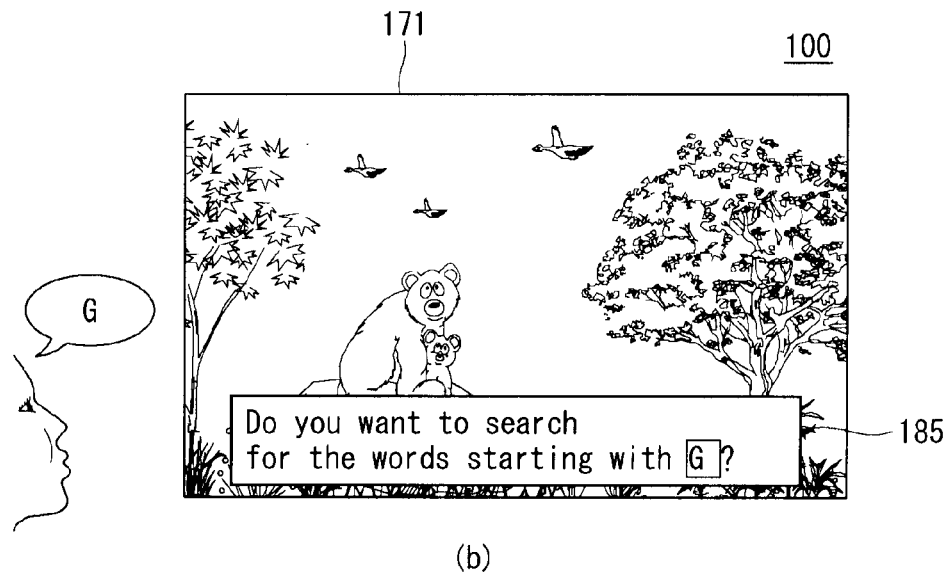
(b)

FIG. 30
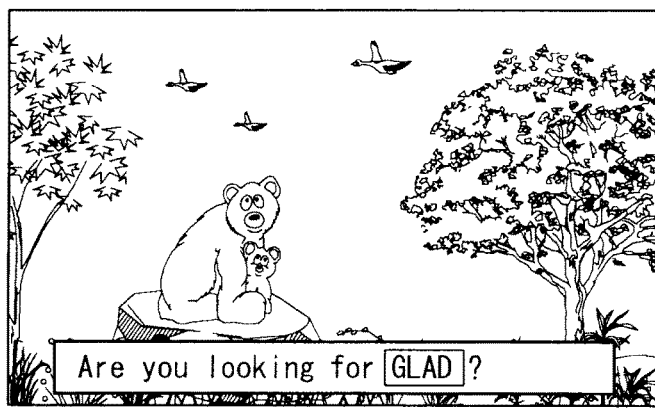
(a)
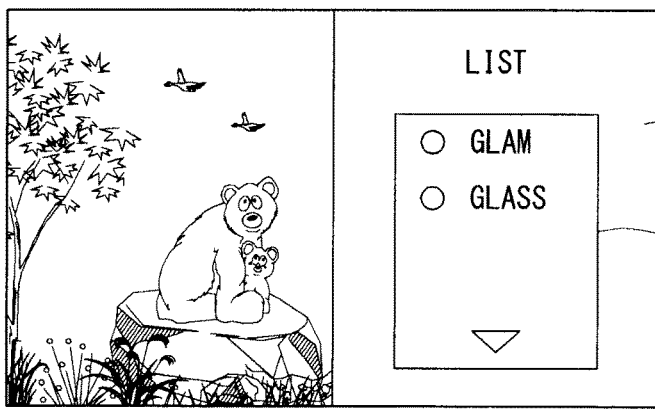
(b) 
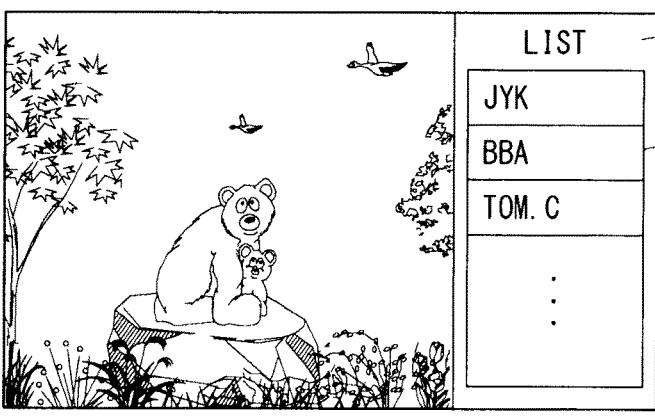

MOBILE TERMINAL AND CONTROL METHOD THEREOF

CROSS-REFERENCE TO RELATED APPLICATIONS

This application claims the benefit of earlier filing date and right of priority to Korean Patent Application No. 10-2014-0157820, filed on Nov. 13, 2014, the contents of which are incorporated by reference herein in their entirety.

BACKGROUND OF THE INVENTION

Field of the Invention

The present invention is related to a display device and a control method for the device, and more particularly, a display device for displaying text corresponding to a user's voice and a control method for the device.

Discussion of the Related Art

A display device refers to the device displaying an image transmitted from a broadcast station through a display unit such as a CRT, PDP, LCD, and OLED. Display devices have evolved from conventional analog TV to digital TV (DTV) capable of outputting high quality video and sound. Display devices are further evolving to Internet Protocol TV (IPTV) allowing access to the Internet.

Display devices of today are capable of providing a function of receiving an electronic program guide (EPG), a function of bidirectional communication, a function of accessing the Internet, and the like in addition to the function of receiving digital broadcast programs. Moreover, a display device of today can be used as a server for a home network environment or a ubiquitous environment.

Meanwhile, IPTV is differentiated from the existing TV by the fact that the IPTV allows random selection of broadcast programs wanted by a user or edition of TV programs. In other words, IPTV provides various advantages in that the IPTV allows a user not only to watch broadcast programs through the Internet in the same way the existing TV does but also to enjoy various contents provided from the Internet without involving a particular operation of PC. Due to these advantages, it is expected that the IPTV capable of providing bidirectional communication is getting more attention from the public.

Therefore, display devices are further required to provide more diversified and convenient functions beyond the existing function of simply displaying contents.

SUMMARY OF THE INVENTION

To meet the needs described above, an object of the present invention is to provide a display device improving a recognition rate of a user's voice by extracting text according to voice recognition from a database storing displayed text and a control method for the device.

To achieve the object above, a display device according to one embodiment of the present invention comprises a display unit, a sound sensing unit, a database storing text displayed on the display unit for a predetermined time period, and a controller extracting from the database at least one text corresponding to a user's voice received within a predetermined time period through the sound sensing unit.

The display unit can display an image corresponding to a broadcast signal, and the controller can store text in the database in case an image with the text is displayed on the display unit.

The database stores a weight for the stored text, and the controller updates the database by increasing the weight for the text displayed on the display unit and extracts from the updated database at least one text corresponding to the user's voice received.

The controller can update the database by increasing the weight for selected text.

The controller can update the database in a voice recognition mode.

The controller can extract a word or a sentence from displayed text and store the extracted word into a first database or the extracted sentence to a second database.

The controller can reduce a weight for the text stored in the database after a predetermined time period.

The controller can delete the text corresponding to a weight below a predetermined threshold from the database.

The controller can identify the user who performs voice recognition and update a database formed separately according to the identified user.

The controller can calculate a matching score representing a degree of matching between the user's voice received and at least one text stored in the database and extract the text corresponding to a maximum score from among the calculated matching scores and display the extracted text.

The controller can increase a weight corresponding to the extracted text.

The display device further comprises a network interface unit for communicating with a search server, and the controller transmits text selected from among at least one displayed text to the search server and receives a search result corresponding to the transmitted text from the search server and displays the received search result.

The display device further comprises a network interface unit for communicating with a voice recognition server, and the controller calculates a matching score between a user's voice received and at least one text stored in the voice recognition server, extracts text corresponding to a maximum score, selects the text corresponding to the higher score between the text providing the maximum score in the database and the text providing the maximum score in the voice recognition server, and displays the selected text.

In case selected text provides the maximum score among the database, the controller can increase a weight for the selected text.

The controller can extract at least one text according to the order of last entry into the database and display the extracted text on the display unit.

The controller can extract text associated with a program displayed on the display unit from the database and display the extracted text.

The controller can display on the display unit a guide screen for selecting text corresponding to a user's voice received.

The display device further comprises a sound output unit, and if a cursor is located at displayed text, the controller converts the text at which the cursor is located into a sound and outputs the sound through the sound output unit.

The controller can display the at least one text extracted on the display unit.

The display device can be one of a TV, a smart phone, a smart glass, and a smart watch.

Meanwhile, a control method for a display device according to one embodiment of the present invention comprises displaying text on a display unit, storing displayed text in a database for a predetermined time period, and extracting at least one text corresponding to a user's voice received within a predetermined time period from the database through a sound sensing unit.

According to at least one of embodiments of the present invention, text corresponding to a user's voice can be extracted from the database storing displayed text, and thus a success rate of voice recognition can be improved.

Additional application scope of the present invention can be made clear from detailed descriptions provided below. However, since various modifications and changes can be clearly understood by those skilled in the art within the technical principles and scope of the present invention, it should be understood that detailed descriptions of the present invention and particular embodiments such as preferred embodiments thereof are provided simply as examples.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is another example of a flow diagram of a control method for a display device according to one embodiment of the present invention;

FIGS. 6 to 12 illustrate operation of a display device according to one embodiment of the present invention;

FIG. 13 is one example of a flow diagram illustrating a process of updating a database in a display device according to one embodiment of the present invention;

FIGS. 14 to 16 are related to one example illustrating a first and a second database in a display device according to one embodiment of the present invention;

FIGS. 23 to 30 illustrate various examples of a search guide according to voice recognition in a display device according to one embodiment of the present invention.

DETAIL DESCRIPTION OF THE INVENTION

Figure 1:
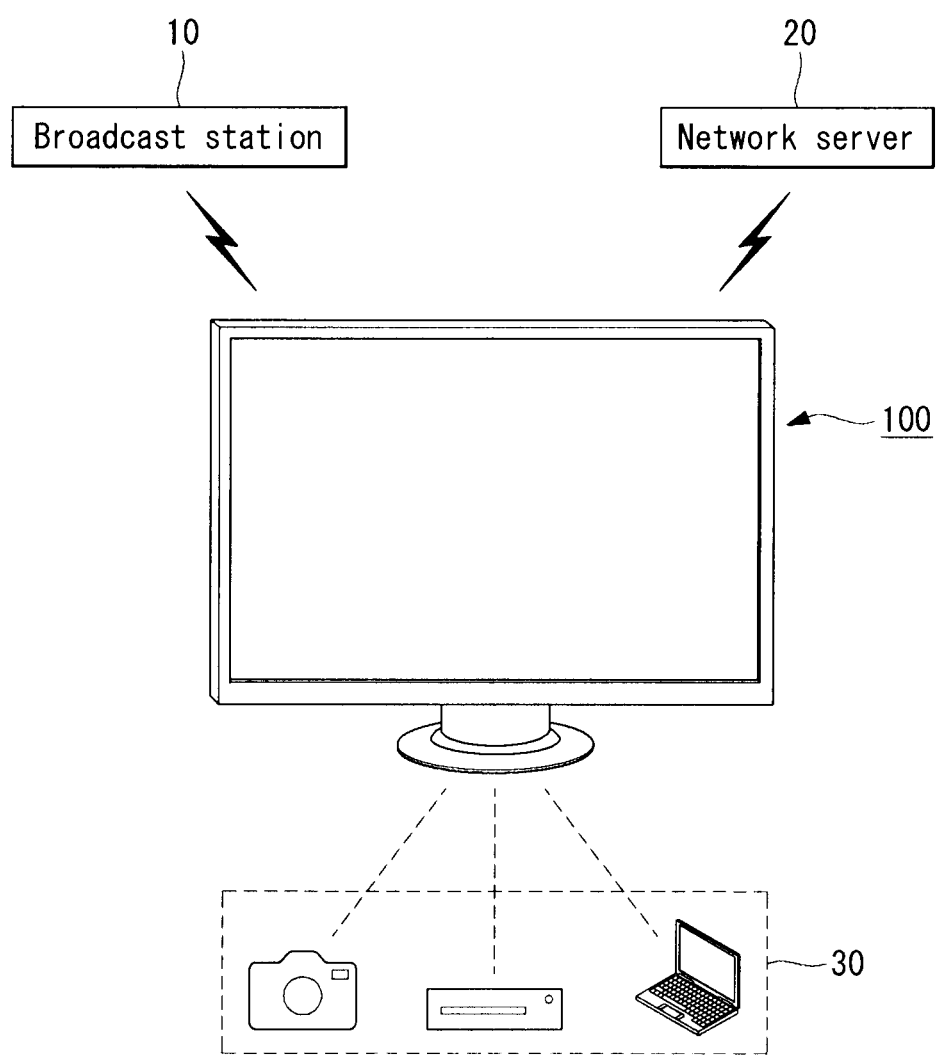
FIG. 1 illustrates communication between a display device according to one embodiment of the present invention and an external device.

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

In what follows, embodiments disclosed in the present document will be described in detail with reference to appended drawings. The same reference number is assigned to the same or similar elements or components irrespective of their drawing symbols and repeated descriptions thereof will be omitted. A suffix such as "module" and "unit" may be assigned or used interchangeably to refer to elements or components. Use of such a suffix herein is merely intended to facilitate description of the specification, and the suffix itself is not intended to give any special meaning or function. Also, in describing embodiments of the present invention, if it is determined that detailed description of a related structure or function known for those in the art obscures the technical principles of the present invention, the corresponding description will be omitted. The appended drawings have been introduced simply to help understanding embodiments disclosed in the present invention and thus, the technical principles of the present invention are not limited by the appended drawings; rather, it should be understood to include every possible modification, equivalent, or substitute of the present invention which belongs to the technical principles and scope of the present invention.

Terms including an ordinal number such as first and second can be used for describing various components but the components should not be limited by the terms. The terms are introduced only for the purpose of distinguishing one component from the others.

If a component is said to be "linked" or "connected" to a different component, the component may be directly linked or connected to the different component but a third component may exist to connect the two components even though the two components may be connected directly. On the other hand, if a component is said to be "linked directly" or "connected directly" to another component, it should be interpreted that there is no further component between the two components.

Singular expression should be interpreted to include plural expressions unless otherwise stated explicitly.

Terms such as "include" or "have" are meant to signify existence of embodied characteristics, numbers, steps, behavior, components, modules, and combinations thereof, which should be understood that possibility of existence or addition of one or more characteristics, numbers, steps, behavior, components, modules, and combinations thereof are not precluded beforehand.

The display device according to the present invention may include an analog TV, DTV, IPTV, smart TV, 3D TV, projection TV, and other various kinds of monitors. Furthermore, the display device can include a desktop computer, digital signage, and so on.

It should be clearly understood by those skilled in the art that the embodiments disclosed in this document can also be applied to a mobile terminal such as a cellular phone, smart phone, laptop computer, digital broadcast terminal, personal digital assistant (PDA), portable multimedia player (PMP), navigation terminal, slate PC, tablet PC, ultrabook, wearable device (for example, smart watch, smart glass, etc.), and head mounted display (HMD) except for those special cases meant only for TV applications.

FIG. 1 illustrates communication between a display device according to one embodiment of the present invention and an external device.

As shown in FIG. 1, a display device 100 according to one embodiment of the present invention can communicate with a broadcast station 10, a network server 20, or an external device 30. Thought not shown in FIG. 1, the display device 100 can further comprise a remote controller (not shown) for controlling the display device 100.

At this time, it should be noted that a display device 100 disclosed in this document is not limited to TV. In other words, except for a special case where composition according to an embodiment of the present invention is applied only for TV, the display device 100 can correspond to a set-top box (STB), an IPTV, or a personal computer.

The display device 100 can receive a broadcast signal including a video signal transmitted from the broadcast station 10. The display device 100 can process a video signal, an audio signal, or a data signal included in a broadcast signal to be appropriate for display in the display device 100. The display device 100 can output video or audio based on the processed video signal. The display device 100 may receive a broadcast signal from multiple broadcast stations.

Meanwhile, the display device 100 can communicate with a network server 20. The network server 20 is such a kind of a device capable of transmitting and receiving a signal to and from the display device 100 through an arbitrary network. For example, the network server 20 may be a mobile terminal which can be connected to the display device 100 through a wired or wireless broadcast station. Also, the network server 20 may be a device capable of providing contents to the display device 100 through the Internet network. A content provider can provide content to the display device 100 by using a network server. Also, the network server 20 may be a device capable of providing various types of web services and other information to the display device 100 through the Internet network. The display device 100 can communicate with multiple network servers.

Meanwhile, the display device 100 can communicate with the external device 30. The external device 30 is such a kind of a device capable of transmitting and receiving a signal directly to and from the display device in a wired or wireless manner. As one example, the external device 30 may be a media storage device or a media play device of a user. In other words, the external device 30 may correspond to a camera, a DVD player, a Bluray player, a personal computer, and so on.

The broadcast station 10, the network server 20, or the external device 30 can transmit a signal including a video signal to the display device 100. The display device 100 can display an image based on a video signal included in an input signal. Also, the display device 100 can transmit to the external device 30 a signal transmitted from the broadcast station 10 or the network server 20 to the display device 100. Also, the display device 100 can transmit to the broadcast station 10 or the network server 20 a signal transmitted from the external device 30 to the display device 100. In other words, the display device 100 provides not only the function of playing the contents included in a signal transmitted from the network server 20 and the external device 30 directly in the display device 100 but also the function of transmitting the contents.

Figure 2:
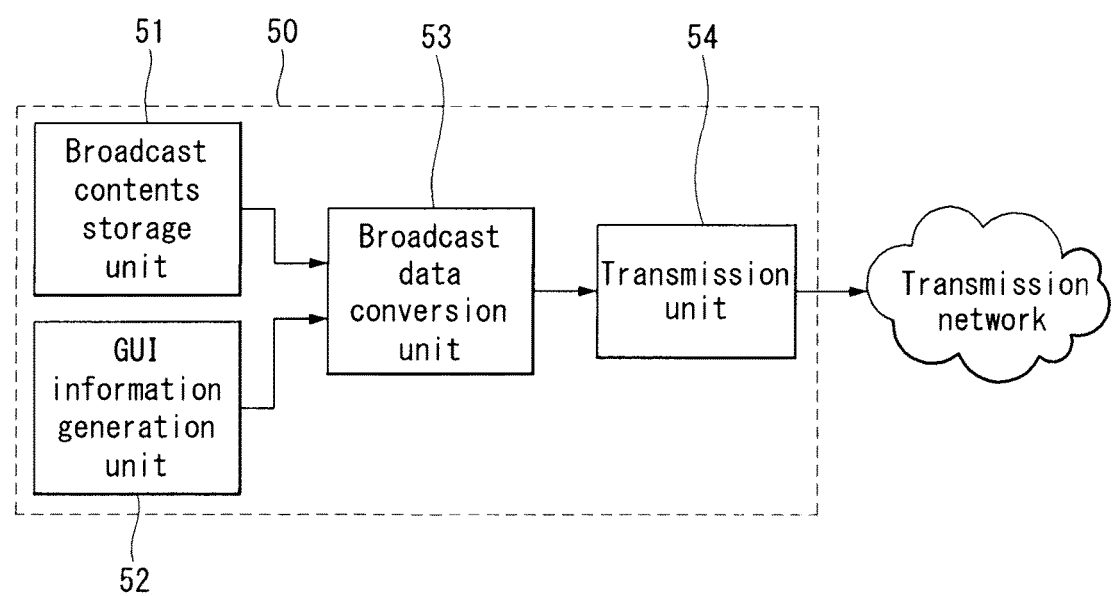
FIG. 2 is one example of a block diagram of a broadcast transmission device according to one embodiment of the present invention.

FIG. 2 is a block diagram of a broadcast transmission device 50 according to one embodiment of the present invention. FIG. 2 uses the broadcast transmission device 50 included in the broadcast station 10 of FIG. 1 as an example.

The broadcast transmission device 50 according to one embodiment of the present invention comprises a broadcast content storage unit 51, a GUI information generation unit, a broadcast data conversion unit 53, and a transmission unit 54.

The broadcast content storage unit 51 stores at least one broadcast content to be transmitted to the display device 100. The broadcast content storage unit 51 may receive broadcast content created from the outside and store the received broadcast content. The broadcast content storage unit 51 may create broadcast content to be transmitted and store the created broadcast content. The broadcast content may include at least one of video, audio, and data. In most cases, depending on the type of broadcast content, it is called video broadcast, audio broadcast, or data broadcast. Broadcast content can alternatively be called multimedia content.

The GUI information generation unit 51 can generate at least one of GUI information to be transmitted to the display device 100 and store the generated GUI information. The GUI information includes at least one of image information, color information, menu information, text information, and screen composition information.

Image information provides information about various kinds of images to be used for generating a GUI. An image may correspond to at least one of a still image, a moving image, flash, and animation. Color information is about image characteristics including color, brightness, chrominance, and so on. Menu information is about a type of a menu to be displayed on a GUI, composition of the menu, and so on. Text information is about text color, font, size, and the like to be used for a GUI. Screen composition information is about composition of an image, a menu, and text to be used for a GUI.

The GUI information stored in the GUI information generation unit 52 can include GUI information unique to the broadcast station 10. For example, the GUI information may include a logo representing the broadcast station 10 or a particular channel that the broadcast station 10 provides. A logo can include an image. Also, the GUI information may include unique GUI information corresponding to particular broadcast content generated by the broadcast station 10.

Meanwhile, the GUI information can include at least one of a graphic element and the audio element. The GUI information can include location information specifying a path to the place where at least one of the graphic and the audio element is stored. For example, a web server run by the broadcast station 10 may store at least one of the graphic and the audio element, and the GUI information stored in the GUI information generation unit 52 may include location information specifying a path to the place of the web server at which the graphic element or the audio element is stored. For example, location information may include a uniform resource locator (URL) address or uniform resource identifier (URI).

In case the display device 100 receives GUI information including location information, the graphic element or the audio element can be downloaded with reference to the location information.

The broadcast data conversion unit 53 can convert broadcast content stored in the broadcast content storage unit 51 and the GUI information generated by the GUI information generation unit 52 into a broadcast data format that can be transmitted. The broadcast data conversion unit 53 may also packetize a broadcast signal generated according to the principles for transmitting a broadcast signal or according to broadcast specifications and output the packetized broadcast signal.

The transmission unit 54 can transmit a broadcast signal generated by the broadcast data conversion unit 53 through a transmission network.

Figure 3:
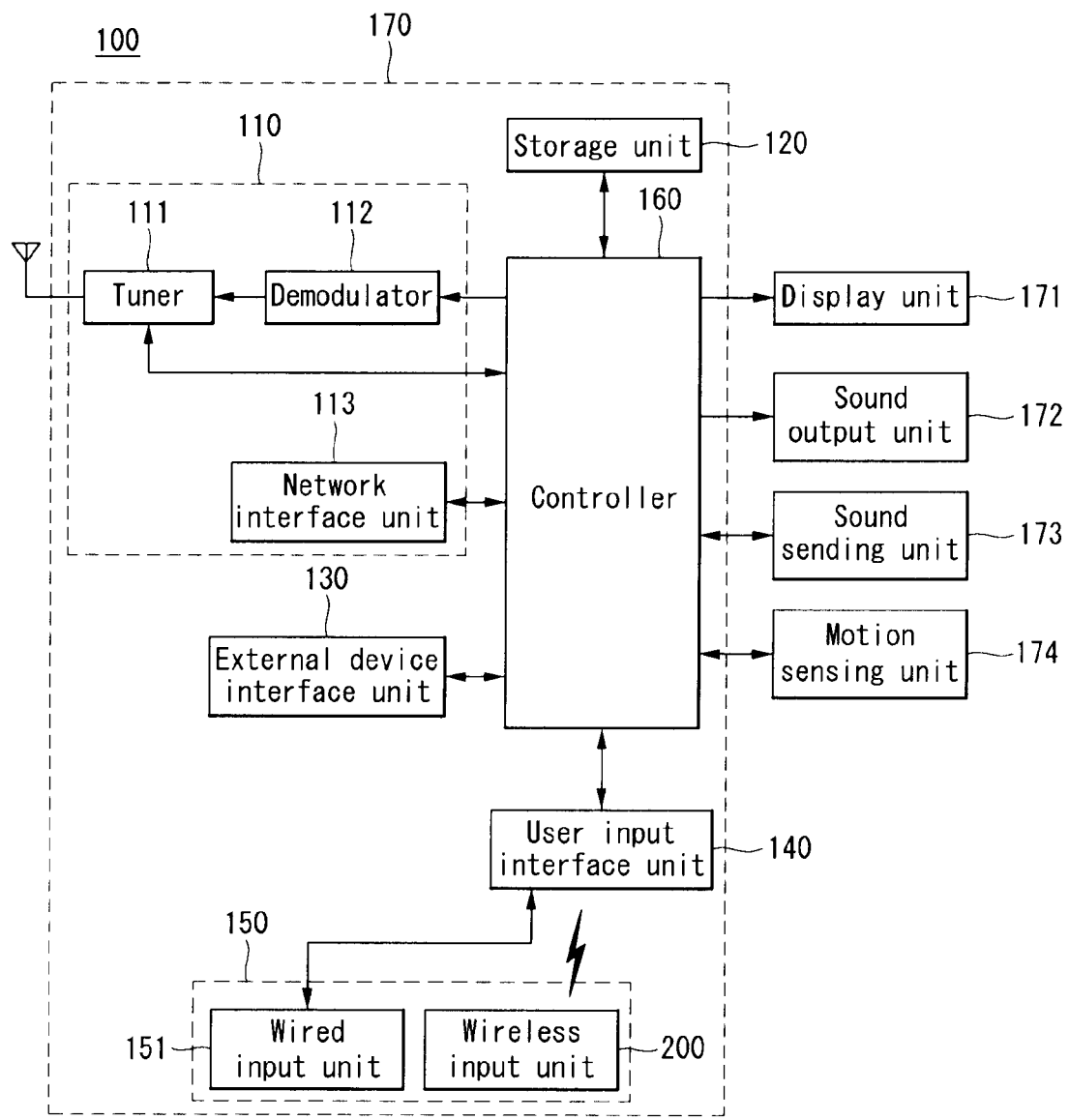
FIG. 3 is one example of a block diagram of a display device according to one embodiment of the present invention.

FIG. 3 is a block diagram of a display device according to one embodiment of the present invention. In what follows, those parts repeating the previous descriptions will be omitted.

With reference to FIG. 3, a display device 100 according to one embodiment of the present invention comprises a display unit 171 displaying an image and a driving unit 170 providing a driving signal to the display unit 171 in accordance with a received broadcast signal.

The display unit 171 may be called a display panel.

The driving unit 170 can control a video display and an audio output of the display device 100. The driving unit 170 can comprise a reception unit 110, an external device interface unit 130, a storage unit 120, a user input interface unit 140, a controller 160, and a command input unit 150.

The driving unit 170 and the display unit 171 can be built into a single body. Also, the driving unit 170 and the display unit 171 can be modularized separately and perform communication in a wired or wireless manner.

Furthermore, the display device 100 according to the present invention can comprise a sound output unit 172 for outputting a sound, a sound sensing unit 173 for sensing a sound, and a motion sensing unit 174 for sensing a user's motion.

In what follows, a display device 100 according to the present invention will be described in more detail.

The reception unit 110 comprises a tuner 111, a demodulator 112, and a network interface unit 113. Depending on the needs, it is possible to design not to include the network interface unit 113 while incorporating the tuner 111 and the demodulator 112. On the contrary, it is equally possible to design not to include the tuner 111 and the demodulator 112 while incorporating the network interface unit 113.

The tuner 111 can select a Radio Frequency (RF) broadcast signal corresponding to the channel selected by the user from among RF broadcast signals received through an antenna or corresponding to all of the pre-stored channels. Also, the tuner 111 converts the selected RF broadcast signal into an intermediate frequency signal, a base band image, or an audio signal.

For example, if the selected RF broadcast signal is a digital broadcast signal, the tuner 111 converts the RF broadcast signal into a digital IF signal (DIF); if the selected RF broadcast signal is an analog broadcast signal, the tuner 111 can convert the RF broadcast signal into an analog baseband video or an audio signal (CVBS/SIF). In other words, the tuner 111 can process both of the digital broadcast signal or the analog broadcast signal. The analog baseband video or the audio signal (CVBS/SIF) output from the tuner 111 can be fed directly into the controller 160.

The demodulator 112 can perform a demodulation operation by receiving a digital IF signal (DIF) converted in the tuner 111.

For example, in case the digital IF signal output from the tuner 111 follows the ATSC scheme, the demodulator 112 can perform, for example, 8-VSB (8-Vestigal Side Band) demodulation. Also, the demodulator 112 can carry out channel demodulation. For this purpose, the demodulator 112 can be equipped with a Trellis decoder, de-interleaver, and Reed Solomon decoder to carry out Trellis decoding, de-interleaving, and Reed Solomon decoding.

For example, in case the digital IF signal output from the tuner 111 follows the DVB scheme, the demodulator 112 can carry out Coded Orthogonal Frequency Division Modulation (COFDM). Also, the demodulator 112 can carry out channel decoding. To this purpose, the demodulator 112 can be equipped with convolution decoder, de-interleaver, and Reed Solomon decoder to carry out convolution decoding, de-interleaving, and Reed Solomon decoding.

The demodulator 112 can output a stream signal (TS) after carrying out demodulation and channel decoding. At this time, the stream signal may be a video signal, an audio signal, or a signal multiplexed with a data signal. As one example, the stream signal can be the MPEG-2 Transport Stream (TS) multiplexed with video signal compliant with the MPEG-2 specification and an audio signal compliant with the Dolby AC-3 specification. More specifically, the MPEG-2 TS can include a header of 4 bytes and a payload of 184 bytes.

The stream signal output from the demodulator 112 can be input to the controller 160.

The controller 160 outputs a video on the display unit 171 after carrying out inverse-multiplexing, video/audio signal processing and outputs the audio through the sound output unit 172.

The external device interface unit 130 can connect an external device to the display device 100 according to the present invention. To this end, the external device interface unit 130 can include an A/V input output unit (not shown) or a wireless communication unit (not shown).

The external device interface unit 130 can be connected to an external device such as Digital Versatile Disk (DVD), Blu-ray, game device, camcorder, and computer in a wired or wireless manner. The external device interface unit 135 can deliver a video, audio, or data signal input from the outside through a connected external device to the controller 160 of the display device 100. Also, the video, audio, or data signal processed in the controller 160 can be output to the connected external device. To this purpose, the external device interface unit 130 can include the A/V input output unit (not shown) or a wireless communication unit (not shown).

The network interface unit 113 can provide an interface for connecting the display device 100 to a wired or wireless network including the Internet network. The network interface unit 113 can be equipped with an Ethernet port for connection to a wired network, and for connection to a wireless network, the network interface unit 113 may employ Wireless LAN (WLAN or Wi-Fi), Wireless broadband (Wibro), World Interoperability for Microwave Access (Wimax), or High Speed Downlink Packet Access (HSDPA) communication specifications.

The network interface unit 113 can transmit or receive data to and from another user or another electronic device through a connected network or another network linked to the connected network.

Meanwhile, the network interface unit 113 can access a predefined web page through a connected network or another network linked to the connected network. In other words, the network interface unit 113 can transmit or receive data to and from the corresponding server by accessing the predefined web page through a network. Besides, the network interface unit 113 can receive contents or data provided by a contents provider or a network operator. In other words, the network interface unit 113 can receive contents such as movie, advertisement, game, VOD, and broadcast signals; and information related to the contents provided by a contents provider or a network operator through the network. Also, the network interface unit 113 can receive update information and a update file provided by a network operator. Moreover, the network interface unit 113 can transmit data to an Internet service provider, contents provider, or network operator.

The storage unit 120 may store a program intended for processing and controlling various signals within the controller 160 or store video, audio, or data signals processed.

Also, the storage unit 120 may carry out a function for temporarily storing video, audio, or data signals input from the external device interface unit 130 or the network interface unit 113. Also, the storage unit 120 can store information about a predefined broadcast channel through a channel memory function.

The storage unit 120 can include at least one type of storage medium from among flash memory type, hard disk type, multimedia card micro type, card type memory (for example, SD or XD memory), RAM, and ROM (EEPROM and the like).

The display device 100 can play a content file stored in the storage unit 120 (for example, a video file, a still image file, a music file, a document file, an application file, and so on) and provide the content to the user.

Although FIG. 3 assumes the case where the storage unit 120 and controller 160 are installed separately from each other, the storage unit 120 can be incorporated into the controller 160.

The command input unit 150 can include an input key for receiving a user's command. The command input unit 150 can include a wired input unit 151 for receiving a command in a wired manner and a wireless input unit 200 for receiving a command in a wireless manner.

The command input unit 150 can receive various commands including power on/off, channel selection, screen setting, volume control, cursor movement on a screen, menu selection, and so on.

Here the wireless input unit 200 can be a remote controller for remote control.

The user input interface unit 140 can deliver a signal that the user inputs to the controller 160 through the command input unit 150 or deliver a signal from the controller 160 to the command input unit 150.

In case the user inputs a predetermined command through a wired input unit 151, the input command may be delivered directly to the controller 160 without passing through the user input interface unit 140.

The user input interface unit 140 may receive and process a command coming from a wireless input unit 200 according to various communication methods such as RF communication and infrared (IR) communication or process the control signal from the controller 160 to be transmitted to the wireless input unit 200.

Also, for example, the user input interface unit 140 can deliver a control signal generated by a local key (not shown) such as a power key, channel key, volume key, and setting key of the command input unit 150 to the controller 160.

The controller 160 may demultiplex a stream input through the tuner 111, demodulator 112, or the external device interface unit 130; or generate and output a signal for video or audio output by processing demultiplexed signals.

The video signal processed by the controller 160 can be fed into the display unit 171 and displayed as an image corresponding to the video signal. Also, the video signal processed by the controller 160 can be fed into an external output device through the external device interface unit 130.

The audio signal processed by the controller 160 can be output through the sound output unit 172. Also, the audio signal processed by the controller 160 can be fed into an external output device through the external device interface unit 130.

Also, the controller 160 can control the overall operation within the display device 100. For example, the controller 160 controls the tuner 111 so that the tuner 111 is tuned to an RF broadcast program corresponding to a channel selected by the user or corresponding to a pre-stored channel.

Also, the controller 160 can control the display device 100 by using a user command input through the user input interface unit 140 or an internal program. In particular, the controller 160 can connect to a network and download an application or an application list that the user wants into the display device 100.

For example, the controller 160 controls the tuner 111 so that a signal of a selected channel can be input according to a predetermined channel selection command received through the user input interface unit 140. And then the controller 160 processes video, audio, or data signals of the selected channel. The controller 160 controls information of a channel that the user has selected so that the information can be output through the display unit 171 or the sound output unit 172 along with the video or audio signals processed.

As another example, the controller 160 controls the video or audio signal coming from an external device such as a camcorder through the external device interface unit 130 according to an external device video play command received through the user input interface unit 140 so that the video or audio signal can be output through the display unit 171 or sound output unit 172.

The controller 160 can control the display unit 171 so that the display unit 171 can display video. For example, the controller 160 can control the display unit 171 so that a broadcast video input through the tuner 111, an external input video received through the external device interface unit 130, a video received through the network interface unit, or a video stored in the storage unit 120 can be displayed on the display unit 171. In this case, the video displayed on the display unit 171 can be a still image or a moving image and the image can be a 2D or a 3D image.

The controller 160 can control playing of contents. In this case, contents may refer to the contents stored in the display device 100, received broadcast contents, or contents received from the outside. Contents may be at least one form of a broadcast video, externally input video, audio file, still image, connected web screen, and document file.

Also, the controller 160 searches for a user terminal connected to the display device through the network interface unit 113, outputs a list of the searched user terminals through the display unit 171, and through the user input interface unit 140, receives a selection signal of the user terminal used as a user controller from among the list of the searched user terminals.

In addition, the controller 160 controls the display device 171 so that player information corresponding to each user terminal can be displayed through the display unit 171.

The display unit 171 can convert a video signal, data signal, and OSD signal processed by the controller 160 or a video signal and data signal received from the external device interface unit 130 into R, G, B signal respectively, thereby generating a driving signal.

The display unit 171 can be implemented in the form of PDP, LCD, OLED, flexible display, or 3D display.

Meanwhile the display unit 171 can be made of a touch screen so that it can be used as an input device as well as an output device.

The sound output unit 172 receives a signal processed by the controller 160, for example, a stereo signal, 3.1 channel signal, or 5.1 channel signal and outputs the received signal as a sound. The sound output unit 172 can be implemented in various forms of speakers.

The sound sensing unit 173 can sense a sound generated from the inside or the outside of the display device 100.

For example, the sound sensing unit 173 can sense various types of sounds generated from the outside of the display device 100, such as a telephone ring sound, a doorbell sound, a water sound, and a user's voice. To this end, the sound sensing unit 173 can include a voice sensor or a microphone.

The motion sensing unit 174 can sense the user's motion. To this end, the motion sensing unit 174 can include a sensor unit (not shown) equipped with at least one of a touch sensor, voice sensor, position sensor, and motion sensor. The signal sensed by the sensor unit can be delivered to the controller 160.

Moreover, the motion sensing unit 174 can include a capture unit (not shown) such as a camera. The image information captured by the capture unit (not shown) can be input to the controller 160.

Also, the motion sensing unit 174 can include a sensor unit and a capture unit together.

The controller 160 can detect the user's gesture by using the image captured by the capture unit (not shown) and the signal sensed by the sensing unit (not shown) separately or by using the two together.

Also, the motion sensing unit 174 can sense the shape of the user's face and the direction that the user's face looks as well as the user's motion.

Meanwhile, the wireless input unit 200 can transmit a user's input to the user input interface unit 140. To this end, the wireless input unit 200 can use Bluetooth, RF communication, IR (Infrared) communication, UWB (Ultra Wideband), and Zigbee communication.

Also, the wireless input unit 200 can receive a video, audio, or data signal output from the user input interface unit 140; and display the received information on the wireless input unit 200 or output the received information in the form of a sound or vibration.

Meanwhile, the display device 100, different from FIG. 3, may not be equipped with the tuner 111 and the demodulator 112 but may receive video content through the network interface unit 113 or through the external device interface unit 130 and play the received video content.

Though not shown in the figure, the display device 100 may be further equipped with a channel browsing process unit which generates a thumbnail image corresponding to a channel signal or an external input signal.

The channel browsing process unit 112 receives a stream signal (TS) output from the demodulator 112 or a stream signal output from the external device interface unit 130, extracts an image from the input stream signal, and generates a thumbnail image from the extracted image. The generated thumbnail image can be input directly to the controller 160 or can be input to the controller 160 after the thumbnail image is encoded. Also, the generated thumbnail image can be input to the controller 160 after being encoded into a stream. The controller 160 can display a thumbnail list carrying a plurality of thumbnail images on the display unit 171 by using the input thumbnail images. Meanwhile thumbnail images within the thumbnail list can be updated sequentially or at the same time. Accordingly, the user can easily figure out the contents of a plurality of broadcast channels.

Figure 4:
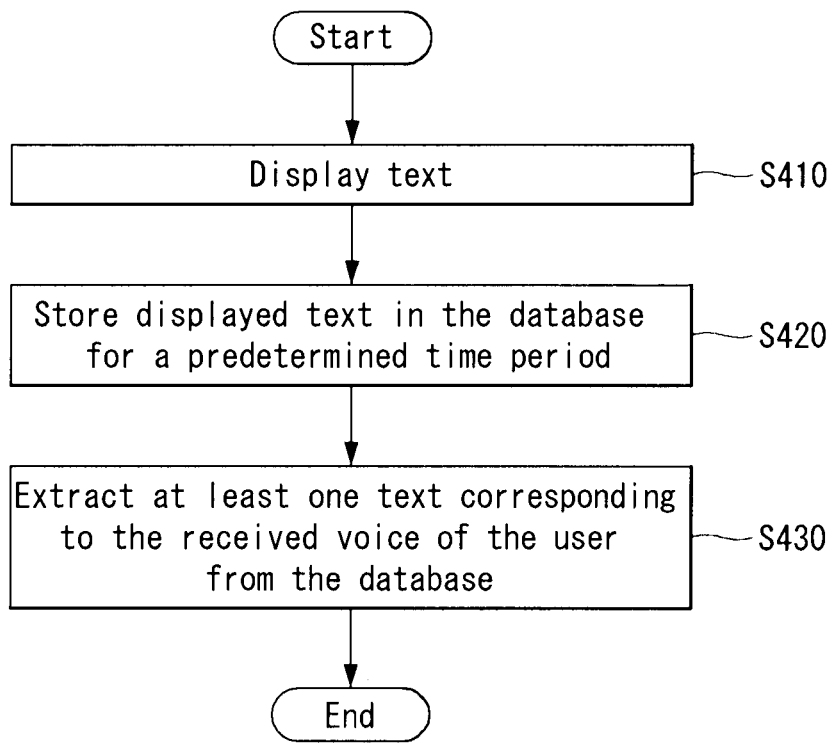
FIG. 4 is one example of a flow diagram of a control method for a display device according to one embodiment of the present invention.

FIG. 4 is one example of a flow diagram of a control method for a display device 100 according to one embodiment of the present invention.

With reference to FIG. 4, the display device 100 can display contents.

More specifically, the display device 100 has not converted into a voice recognition mode, and the controller 160 can output a broadcast program by receiving a broadcast signal. Also, the controller 160 can output an image stored in the storage unit 120 or a video played in an external device 30 connected to the display device 100.

Afterwards, the display device 100 can display text included in the contents S410.

In this case, text can be a subtitle included in a broadcast program or a video, but is not limited to the aforementioned examples. In other words, text may assume various forms or provide various uses, including the text used to show a logo 192 or a title displayed to represent a broadcasting company.

Besides, text may include all kinds of images that can be converted into characters by optical character recognition (OCR) technology. Therefore, it is assumed that the text described below is an image displayed on the display unit 171, which can be converted into the corresponding text by OCR technology.

Although the term of text has been used in the following description, the present invention is not limited to the specific description. In other words, the text may refer to all kinds of characters including a character, number, symbol, word, and sentence that correspond to a user's voice.

Now, the display device 100 can store displayed text in the database for a predetermined time period S420.

In this case, the database may correspond to an embedded database of the display device 100 and can be formed within the storage unit 120.

Also, the controller 160 can store displayed text only for a predetermined time period, and if a user's voice corresponding to the stored text is not received within a predetermined time period, the controller 160 can delete the stored text from the database. In other words, if a user's voice corresponding to the displayed text is received within a time period stored temporarily in the database, a weight is assigned to the displayed text to be stored together in the database. More specific descriptions about the above will be given with reference to FIG. 5.

Meanwhile, the operation of the controller 160 to store displayed text in the database for a predetermined time period may ignore whether the display device 100 is in a voice recognition mode. In other words, in case the display device 100 is in the voice recognition mode, the text corresponding to a received voice of the user from among the text stored in the database remains in the database but the other text can be deleted after a predetermined time period. Also, if the display device 100 is not in the voice recognition mode, since the user's voice corresponding to the text stored in the database is not received, the text stored in the database can be deleted after a predetermined time period.

Meanwhile, the database can store raw data of displayed text. Therefore, the controller 160 can store the raw data with respect to the displayed text into the database; if the user's voice corresponding to the raw data is received, the controller 160 can convert the stored raw data into the text and display the text.

Afterwards, the display device 100 can be converted into the voice recognition mode, and the display device 100 which has entered the voice recognition mode can receive the user's voice. Therefore, the display device 100 can extract at least one text corresponding to the received voice of the user from the database S430.

More specifically, in the voice recognition mode, the user can utter a command for operating the display device 100. In other words, the user can utter a search query for the database. For example, if the user wants to search for "AAA", he or she utters "AAA".

After receiving the user's voice, the controller 160 can extract text corresponding to the received voice of the user from the database. The controller 160 can extract at least one text similar to the user's voice from among the text stored in the database.

Also, the controller 160 can display at least one extracted text on the display unit 171. In other words, the controller 160 can extract at least one text corresponding to the query intended by the user from the database and display the extracted text on the display unit 171.

FIG. 5 is another example of a flow diagram of a control method for a display device 100 according to one embodiment of the present invention. In what follows, those parts repeating the previous description will be omitted.

With reference to FIG. 5, the display device 100 in the voice recognition mode can display contents. Also, the display device 100 in the voice recognition mode can display the text included in the contents on the display unit 171, S510.

Here, the user can convert the display device 100 into the voice recognition mode by selecting a button formed on a remote controller 200; by selecting the same button once more, the user can release the voice recognition mode.

Afterwards, the display device 100 in the voice recognition mode can increase the weight of the displayed text S520 and store the displayed text in the database along with the increased weight. Therefore, in the voice recognition mode, once the text is displayed on the display unit 171, the database can be updated.

More specifically, once the voice recognition mode is activated, the controller 160 can detect the text displayed on the display unit 171 and increase a weight associated with the detected text. At this time, the weight is a data combined with the text stored in the database, which can function as a reference by which the text corresponding to converted text can be extracted from the database. A specific example of using the weight will be described later.

Meanwhile, the display device 100 can update the database by storing displayed text and increased weights into the database. In this case, the database may be filled with raw data with respect to the displayed text. Therefore, in the same way as described above, the controller 160 stores raw data with respect to the displayed text into the database and if a user's voice corresponding to the displayed text is received, converts the stored raw data into text and displays the text.

Meanwhile, the controller 160 can increase the weight for the detected text and store the weight into the database. For example, if the text displayed on the display unit 171 is "AAA", the controller 160 can increase the weight corresponding to the detected text "AAA".

In the same way, if the text displayed on the display unit 171 is detected as "AAA of BBB", the controller 160 can increase the respective weights of the detected words "AAA" and "BBB" and the detected phrase "AAA of BBB".

Therefore, the database can be updated as the detected text and the corresponding weight increased in association therewith are stored in the database.

In this case, the database can be an embedded database with respect to the display device 100 and can be formed within the storage unit 120. Also, a specific value of the weight is not confined to a particular value, but can be set in a random fashion.

Afterwards, the display device 100 can determine whether a user's voice has been received S530. In this case, the received voice of a user corresponds to a query to search for the database, as described previously.

Therefore, if it is determined that a user's voice has been received S530_Y, the controller 160 extracts at least one text corresponding to the received voice of a user from the updated database and displays the extracted text S540.

More specifically, the controller 160 can extract the text corresponding to the received voice of a user from the database updated at the S520 step. In this case, it can be set so that only the text corresponding to the weight above a predetermined value from among at least one text similar to the user's voice can be extracted.

Also, in case the text corresponding to the received voice of the user among the text stored in the database is plural, the controller 160 can extract the text in the order of a weight and display the text in that order. In other words, a high weight indicates that the corresponding text has been used many times in the voice recognition mode and again indicates that the user has an interest in the text. In other words, text with a large weight has a high probability of user selection compared to the text with a relatively small weight.

Therefore, the controller 180 enables the user to select text easily by extracting and displaying at least one text corresponding to a user's voice in the order of weights.

For example, there are times although the user utters "AAA", the controller 160 recognizes it as "ABC" and carries out conversion based on the recognition. This is so because the display device 100 has not been fully trained with respect to the corresponding text or the user's voice. In other words, in case a word uttered by the user corresponds to a coinage, jargon, or slang or the user's pronunciation is somewhat unclear, the display device 100 may fail to recognize the word or recognize it as a different pronunciation.

Therefore, according to the present invention, since the display device 100 carries out voice recognition according to the database with weights, an effect of improving a success rate of voice recognition of the user can be achieved.

Meanwhile, if it is determined that the database contains no text corresponding to the received voice of the user, the controller 160 is unable to extract and display the corresponding text. This situation may happen if the user's pronunciation for the corresponding text is not clear to specify a target to be extracted from the database or if the corresponding text is a coinage, jargon, or slang. Therefore, in these cases, the text corresponding to the user's voice can be received from the voice recognition server 20 for display, which will be described with reference to FIG. 17.

Next, the display device 100 can determine whether at least one displayed text has been selected S550.

If it is determined that the user has selected none of at least one displayed text S550_N, the controller 160 extracts at least one text corresponding to the received voice of the user again from the database and display the extracted text S540. In this case, the controller 160 can display a message notifying that there is no text corresponding to the user's voice.

On the other hand, if it is determined that the user has selected one from among at least one text S550_Y, the controller 160 increases the weight associated with the selected text and carries out a search with respect to the selected text through the search server 20, S560.

More specifically, the displayed at least one text corresponds to a query list that the user wants to search for through the search server 20, and one from the query list is the target query that the user wants to search for through the search server 20. Therefore, the controller 160 can transmit the query, which is one selected text, to the search server 20. The search server 20 which has carried out a search based on the received query can transmit a search result to the display device 100. Therefore, the display device 100 can display the search result received from the search server 20 on the display unit S570.

FIGS. 6 to 12 illustrate operation of a display device 100 according to one embodiment of the present invention.

In what follows, a specific example of updating a database along with a specific definition of a weight will be described. More specifically, described will be a process where a weight associated with text displayed on the display unit 171 is increased; text corresponding to a user's voice is selected; and a search based on the selected text is carried out.

FIG. 6 is an example of an initial database stored in the storage unit 120. As shown in FIG. 6, the database can store text and a weight associated with the text.

Afterwards, as shown in FIG. 7, contents can be played and displayed on the display unit 171. In this case, the controller 160 can display the text contained in the contents on the display unit 171. FIG. 7 illustrates a case where a subtitle 191 is displayed.

Meanwhile, in the voice recognition mode, the controller 160 can detect displayed text. For example, while the display device 100 stays in the voice recognition mode, the controller 160 can detect that "GLASS" and "GLAM" are being displayed on the display unit 171.

At this time, the fact that the user has changed the display device 100 into the voice recognition mode while "GLASS" and "GLAM" are being displayed may indicate that the user has an interest in the text of "GLASS" and "GLAM". In other words, since there needs to put a high priority for the displayed text compared with other text by increasing the weight associated with the displayed text in which the user has an interest, the controller 160 can increase the weight associated with the detected text.

Therefore, as shown in FIG. 7, the weights associated with "GLASS" and "GLAM" have been increased by 2 respectively, and the database can be updated by reflecting the increased weights. It should be noted that a specific value set for the weight is not limited to the example and can be set in a random fashion.

Afterwards, the user can utter text that he or she wants to search for, and FIG. 8 illustrates a case where the user utters "GLAM". In this case, the controller 160 can extract the text corresponding to the user's voice from the database and display the extracted text.

More specifically, with reference to FIG. 8, the user has uttered "GLAM", and the controller 160 can determine "GLAM", "GLAD", "GLASS", and "GRADE" as the text corresponding to "GLAM" that the user has uttered. Therefore, the controller 160 can display all of the text corresponding to the user's utterance, "GLAM", "GLAD", "GLASS", and "GRADE" on the display unit 171.

However, it is preferable for the controller 160 to extract and display only the text which has a weight larger than a predetermined value. In other words, the aforementioned condition indicates that the user may have an interest in the text which has a weight larger than a predetermined value.

FIG. 8 shows a case of displaying only the text having a weight larger than 4 from among the database of FIG. 7.

Therefore, the controller 160 can display text having a weight larger than a predetermined value in a search area 180 formed on one side of the display unit 171. In this case, the controller 160 can display text in the descending order of weights.

Next, the user can select one of a plurality of displayed text and the selected text can correspond to the query which is a search target.

Meanwhile, though FIG. 8 assumes that a plurality of the text corresponding to the user's voice is extracted and displayed, the present invention is not limited to the specific assumption. In other words, no more than one text corresponding to the user's voice may be extracted and displayed.

More specifically, with reference to FIG. 9, the user pronounces "GLAM", and the controller 160 determines that the text "GLAM" corresponds to the user's voice "GLAM". Therefore, the controller 160 can display the text "GLAM" corresponding to the user's utterance on the display unit 171. In this case, the controller 160 can display on the search area 180 a message by which the user can check the extracted text.

Afterwards, the user can select one displayed text and the selected text can correspond to the query of a search target.

FIG. 10 illustrates a database updated as "GLAM", which is the displayed text of FIG. 8 or 9, is selected. In other words, since the user Also, FIG. 11 shows a search result obtained as the displayed text "GLAM" of FIG. 8 or 9 is selected. In other words, since the user selects "GLAM" as the query from among the displayed text, the controller 160 can select the text "GLAM" as the query. Therefore, in the search window 181, the query "GLAM" is displayed, and the controller 160 transmits the query to the search server 20. The search server 20 transmits a search result 183 according to the query to the display device 100, and the controller 160 can display the received search result 183 on the search area 180.

Meanwhile, although FIGS. 8 and 9 assume that the user utters the text displayed in the form of a subtitle, the present invention is not limited to the assumption. In other words, the present invention can also be applied to the case where the user utters text different from the text displayed as a subtitle.

Meanwhile, it is no necessary for the user to utter text right after the database according to the subtitle 191 is updated. In other words, the voice recognition mode can be released after database is updated according to the subtitle 191 in the voice recognition mode; the user can safely make an utterance after the voice recognition mode is activated again.

Meanwhile, if a predetermined time period is passed, the controller 160 can decrease the weight associated with the text stored in the database.

More specifically, FIG. 12 illustrates a case where the weight for each text is decreased by 1 in the database of FIG. 6. This may imply that while the database is in the state of FIG. 6, no weight has been increased for a predetermined time period. And that the weight associated with particular text is not increased may indicate that the user's utilization of the corresponding text is low. Therefore, the database can be personalized by reducing the weight associated with the text of low utilization and by increasing the weight associated with the text of high utilization.

In this case, the controller 160 can remove the text corresponding to the weight below a predetermined value from the database. For example, the text with a weight of 0 can be regarded as the text no more used by the user, and as shown in FIG. 12, the text with a weight of 0, "GRADE" can be removed from the database.

However, the text removed from the database can be stored again in the database, which will be described later.

Meanwhile, since the type of text displayed on the display unit 171 varies, there needs a database accommodating text types. FIGS. 13 to 16 illustrate a specific method for storing various types of text in a database.

FIG. 13 is one example of a flow diagram illustrating a process of updating a database in a display device 100 according to one embodiment of the present invention. In what follows, those parts repeating the previous descriptions will be omitted.

With reference to FIG. 13, the display device 100 can play contents. In this case, while in the voice recognition mode, the controller 160 can display the text included in the contents on the display unit 171, S1310.

Afterwards, the display device 100 can perform morphological analysis with respect to the displayed text S1320. Therefore, the controller 160 can store in a first database at least one word for which morphological analysis has been completed from among the displayed text S1330.

Also the controller 160 can increase the weight associated with the word stored in the first database according to the morphological analysis, where the specific method of increasing the weight is the same as described above.

Meanwhile, in case the displayed text consists of only one word, the word can be stored in the first database; however, in case the displayed text is a combination of words, the following process can be further carried out.

In other words, the controller 160 can perform syntax analysis on the basis of the words stored in the first database according to the morphological analysis S1340. Therefore, the controller 160 can store at least one sentence extracted from the syntax analysis in a second database S1350.

Also, the controller 160 can increase the weight associated with a sentence stored in the second database according to the syntax analysis, where the specific method of increasing the weight is the same as described above.

In other words, suppose a sentence of "SEARCH AAA" has a weight of 1 and is stored in the second database. In this case, if the displayed text is determined to be "SEARCH AAA" according to syntax analysis in the voice recognition mode, the controller 160 can increase the weight to 3, which is associated with the text "SEARCH AAA" stored in the second database.

Meanwhile, the controller 160 may carry out speech act analysis after syntax analysis. In other words, the controller 160, by applying speed act analysis on the text for which the syntax analysis has been completed, can analyze the meaning of the text more accurately. The controller 160 can store the sentence for which the speech act analysis has been completed into the second database. Also, the method of increasing a weight according to syntax analysis can also be applied to speech act analysis.

In other words, the display device 100 carries out morphological analysis, syntax analysis, and speech act analysis with respect to the displayed text and weights according to the respective analysis can be assigned. Therefore, the user's voice can be learnt more precisely, leading to an improved success rate of voice recognition.

Meanwhile, specific methods for morphological analysis, syntax analysis, and speech act analysis are well known in the corresponding technical field; therefore, detailed descriptions thereof will be omitted.

FIGS. 14 to 16 are related to one example illustrating a first and a second database in a display device according 100 to one embodiment of the present invention. In what follows, a specific example of FIG. 13 will be described.

With reference to FIG. 14, a first database stores a word "GLAD" and a second database stores a sentence which reads "GLAD TO SEE YOU". Also, it is assumed that the weight associated with "GLAD" is 4 while the weight associated with "GLAD TO SEE YOU" is 1.

Afterwards, in the voice recognition mode, the user can utter "GLAD". In this case, the controller 160 can extract the text corresponding to "GLAD" that the user has uttered from the first and the second database. Since "GLAD" that the user has uttered is not a sentence but a word, the controller 160 can extract text from the first database rather than the second database.

Therefore, the controller 160 increases the weight associated with "GLAD" which is the text stored in the first database, but may not increase the weight associated with the text "GLAD TO SEE YOU" stored in the second database.

Meanwhile, different from the case of FIG. 15, the user can utter "GLAD TO SEE YOU" in the voice recognition mode. In this case, the controller 160 can extract text corresponding to "GLAD TO SEE YOU" that the user has uttered from the first and the second database.

At this time, the controller 160 can carry out morphological analysis of "GLAD TO SEE YOU", and the word "GLAD" extracted from the morphological analysis can be stored in the first database. Therefore, the weight associated with "GLAD" stored in the first database can be increased.

Afterwards, the controller 160 can carry out syntax analysis of "GLAD TO SEE YOU" and the sentence of "GLAD TO SEE YOU" extracted from the syntax analysis can be stored in the second database. Therefore, the weight associated with "GLAD TO SEE YOU" stored in the second database can be increased.

Meanwhile, FIGS. 13 to 16 assume that a separate database is provided for each text, but the present invention is not limited to the aforementioned assumption. In other words, databases can be divided according to the respective users. In other words, the controller 160 identifies a user carrying out voice recognition and based on the identified user, forms a separate database and increases the corresponding weight separately.

More specifically, the display device 100 comprises a camera, and the camera can capture the user who watches contents through the display unit 171. In this case, the controller digitizes the characteristics of the captured face of the user and stores the digitized data into a database. Also, since the display device 100 forms multiple databases for carrying out voice recognition of the respective users, the controller 160 can extract queries according to the user's utterance from the databases different from each other.

In the same manner, the display device 100 comprises a microphone, and the microphone can receive the user's voice uttered in the voice recognition mode. In this case, the controller 180 can digitize characteristics of the receive voice of the user and store the digitized characteristics into a database. Also, since the display device 100 forms multiple databases for carrying out voice recognition of the respective users, the controller 160 can extract queries according to the user's utterance from the databases different from each other.

According to the method above, not only text is stored in a separate database according to each user but also the weight associated with text can be varied according to each user. Therefore, since the display device 100 can store and extract the text to which a different weight has been applied for each user, a much higher success rate for voice recognition can be obtained.

Figure 17:
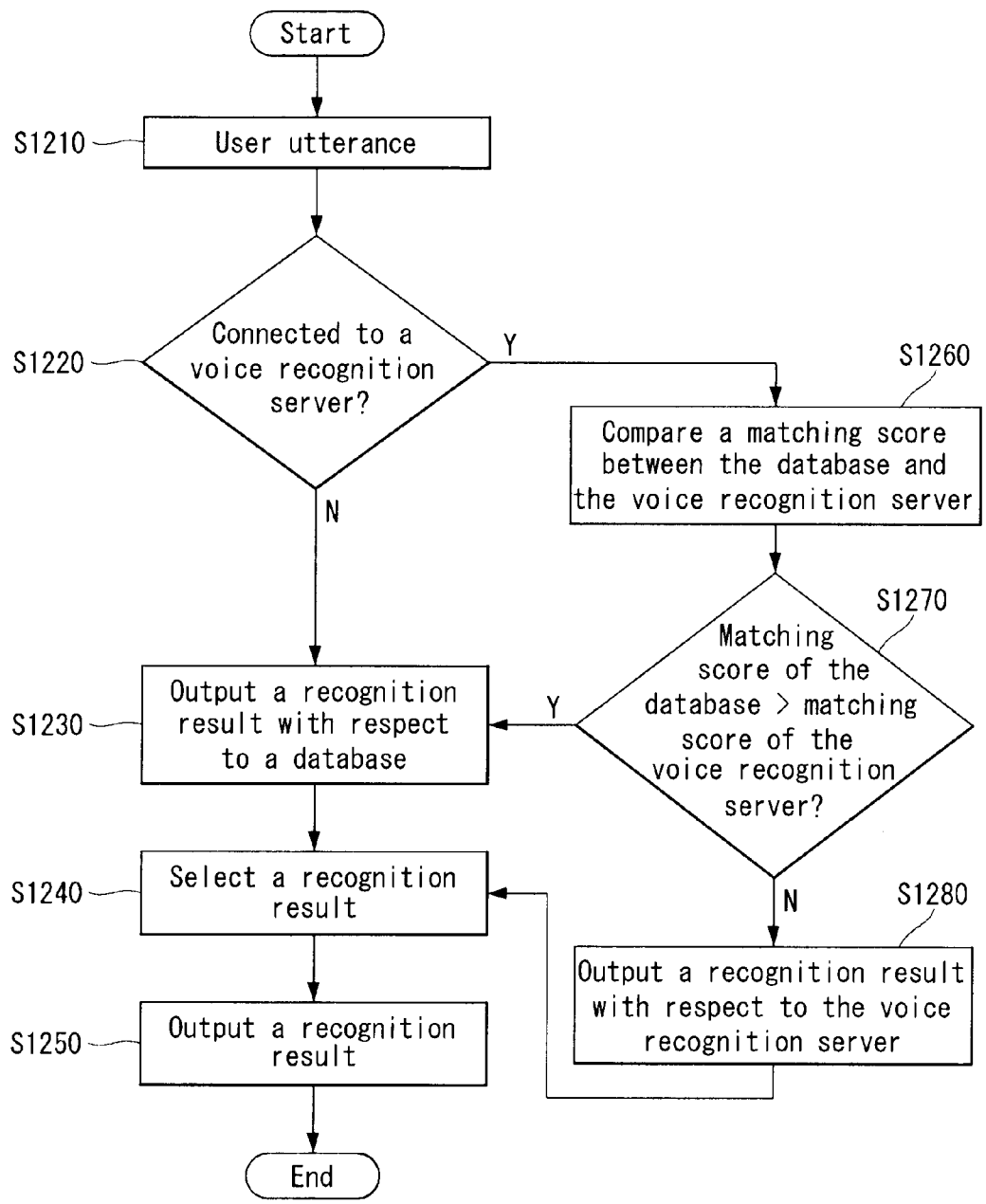
FIG. 17 is one example of a flow diagram illustrating a process of outputting a search result according to voice recognition in a display device according to one embodiment of the present invention.

FIG. 17 is one example of a flow diagram illustrating a process of outputting a search result 183 according to voice recognition in a display device 100 according to one embodiment of the present invention. In what follows, those parts repeating the previous descriptions will be omitted.

With reference to FIG. 17, if the user utters a word in the voice recognition mode S1710, the controller 160 can receive the user's voice uttered. At this time, the user's utterance becomes the target of voice recognition and may imply the user's voice corresponding to the query for a search. For example, to carry out a search for a particular word or a particular sentence, the user can utter the corresponding word or the corresponding sentence. Therefore, the sound sensing unit 173 can receive the user's voice and transmit the received user's voice to the controller 160.

Afterwards, the controller 160 can determine whether the network interface unit and the voice recognition server 20 are connected to each other S1720.

If it is found that the network interface unit and the voice recognition server 20 are not connected to each other S1720_N, the controller 160 can output the result of recognition with respect to the database S1730. At this time, the voice recognition server 20 may be such a kind of a device which is connected to the network interface unit and transmits the text corresponding to the user's voice to the display device 100. In other words, since the voice recognition server 20 and the display device 100 are not connected to each other, the controller 160 can extract the text corresponding to the received voice of the use from the database and display the extracted text.

Afterwards, while at least one text, which is a recognition result with respect to the database, is being displayed, the controller 160 can select one text S1740. The selected one text may be a query used to carry out a search.

Therefore, the controller 160 transmits the selected text to the search server 20 through the network interface unit, receives a search result corresponding to the transmitted text from the search server 20, and displays the received search result S1750.

Meanwhile, if it is found that the network interface unit and the voice recognition server 20 are connected to each other S1720_Y, the controller 160 can compare a text matching score with respect to the database with a text matching score with respect to the voice recognition server 20, S1760.

At this time, the matching score may represent a value indicating the degree of being matched between the received voice of the user and the database or the text stored in the voice recognition server 20. The definition of a matching score and specific descriptions about text extraction according to the definition will be given with reference to FIGS. 18 to 22.

Also, the controller 160 can extract from the database the text providing the maximum score among matching scores between the received voice of the user and at least one text stored in the database and displays the extracted text. In the same manner, the controller 160 can extract from the voice recognition server 20 the text providing the maximum score among matching scores between the received voice of the user and at least one text stored in the voice recognition server 20 and displays the extracted text. Therefore, the controller 160 can compare the maximum matching score of the text extracted from the database with the maximum matching score of the text extracted from the voice recognition server 20.

Therefore, if it is determined that the maximum matching score of the text extracted from the database is higher than the maximum matching score of the text extracted from the voice recognition server 20 S1770_Y, the controller can output a recognition result with respect to the database S1730. In other words, if the received voice of the user is more similar to the text extracted from the database than the text extracted from the voice recognition server 20, the controller 160 can select and display the text extracted from the database. In this case, the controller 160 can increase the weight associated with the selected text.

On the contrary, if it is determined that the maximum matching score of the text extracted from the database is lower than the maximum matching score of the text extracted from the voice recognition server 20 S1770_N, the controller 160 can output a recognition result with respect to the voice recognition server 20 S1780. In other words, if the received voice of the user is more similar to the text extracted from the voice recognition server 20 than the text extracted from the database, the controller 160 can select and display the text extracted from the voice recognition server 20.

Meanwhile, if it is found that the maximum matching score of the text extracted from the database is the same as the maximum matching score of the text extracted from the voice recognition server 20, the controller 160 can output either of the recognition results from the database and the voice recognition server 20.

FIGS. 18 to 22 are related to one example of a flow diagram illustrating a process of updating a database of coined words in a display device 100 according to one embodiment of the present invention.

Figures 18, 19, 20:
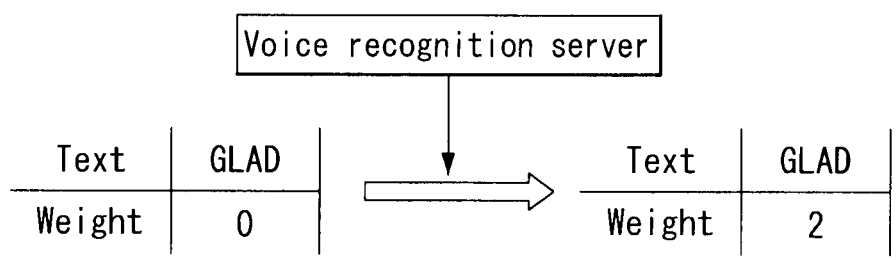
FIGS. 18 to 22 are related to one example of a flow diagram illustrating a process of updating a database of coined words in a display device according to one embodiment of the present invention.

FIG. 18 illustrates the definition of a matching score. In what follows, it is assumed that the user utters "GLAD" in the voice recognition mode.

In other words, the received voice of the user is "GLAD" and the controller 160 calculates a matching score to extract the text matching the user's utterance "GLAD" from among the text stored in the database or the voice recognition server 20.

In this case, as shown in FIG. 18, the text "GLAD" stored in the database and the voice recognition server 20 all match the received voice of the user "GLAD". Therefore, in this case, the matching score can be 100.

Also, with respect to the received voice of the user "GLAD", "GLAM" shows a lower matching score than the "GLAD". Therefore, the matching score between "GLAD" and "GLAM" can be smaller than 100. A matching score can be calculated in the same way as above for "GLASS" and "GRADE" illustrated in FIG. 18.

Meanwhile, the type of code illustrated in FIG. 18 is simply an example, and the present invention is not limited to the example. Also, since a specific method for calculating the matching score is already well known to the public, detailed descriptions thereof will be omitted.

FIG. 18 illustrates the definition of a matching score, and in what follows, a specific example of text extraction according to the matching score will be described.

As described above, the database can be built according to learning about a particular user. Weights with respect to the text stored in the database can assume various values. On the other hand, the voice recognition server 20 does not employ learning about a particular user. Therefore, the controller 160 can set the weight associated with the text stored in the voice recognition server 20 to 1.

FIG. 19 illustrates a case where the text corresponding to a received voice of a user is not stored in the database but stored only in the voice recognition server 20. In other words, the text corresponding to the maximum matching score of the received voice of the user, "GLAD" is not stored in the database but stored only in the voice recognition server 20. Therefore, the controller 160 can compare the maximum matching score of the text extracted from the database with the maximum matching score of the text extracted from the voice recognition server 20.

In this case, the controller 160 can calculate the final matching score as a multiplication of the maximum matching score with a weight. With reference to FIG. 19, the final matching score of the voice recognition server 20 is 100 while the final matching score of the database is 0. Therefore, the controller 160 can extract "GLAD" from the voice recognition server 20, where the final matching score of the text "GLAD" is higher than that in the database, and displays the extracted text.

In this case, the controller 160 can store the text extracted from the voice recognition server 20 into the database. In other words, as shown in FIG. 20, "GLAD" extracted from the voice recognition server 20 can be newly added into the database as a predetermined weight.

Figures 21, 22:
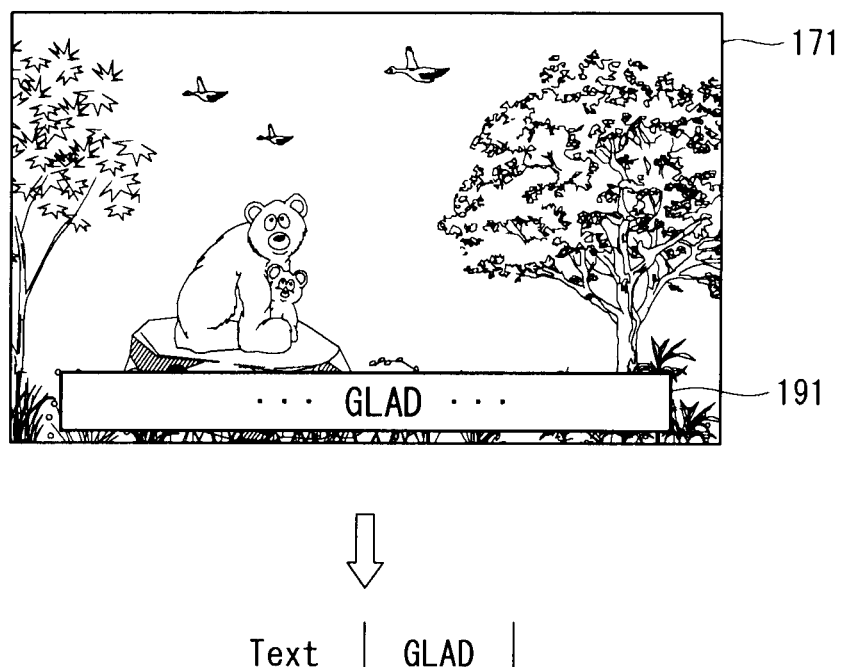

Afterwards, as shown in FIG. 21, text can be displayed in the voice recognition mode. In this case, as shown in FIG. 7, the weight associated with the displayed text can be increased.

Afterwards, with respect to the received voice of the user, the controller 160 can compare the final matching score of the text extracted from the database with the final matching score of the text extracted from the voice recognition server 20. In this case, as shown in FIG. 22, due to the weight, the final matching score of the text stored in the database can have a higher value.

In other words, the smallest value is assigned to the weight associated with the text stored in the voice recognition server 20. Therefore, it may imply that once text is stored in the database, text is extracted from the database for the user's voice received afterwards. Therefore, the controller 160 increases a weight for the text extracted from the database, thereby carrying out learning about the user's voice.

FIGS. 23 to 30 illustrate various examples of a search guide according to voice recognition in a display device 100 according to one embodiment of the present invention. In what follows, those parts repeating the previous descriptions will be omitted.

FIG. 23 illustrates a case where the text corresponding to a user command received in the voice recognition mode is displayed according to the time stored in the database. According to FIG. 23, the controller 160 can extract and display the text from the database in the order of last entry into the database. In this case, the controller 160 store in the database the displayed text and information of time for which the text has been displayed.

More specifically, with reference to FIG. 23(a), while the display device 100 is in the voice recognition mode, the user may say "Display the words starting with 'G' from the subtitles displayed within one hour." In this case, the controller 160 can search the database for the text starting with 'G' among the text stored in the database within one hour from the time of the user's utterance and display the searched text in the query list 182.

In this case, the controller 160 can display the text in the query list 182 according to the order of last entry into the database. Also, the controller 160 may display the text in the query list 182 in the order of weight. Afterwards, as described above, the controller 160 can increase the weight associated with the selected one text.

Also, with reference to FIG. 23(b), while the display device 100 is in the voice recognition mode, the user can utter "G". In this case, the controller 160 can recognize the user's voice as a command to search the database for the text starting with 'G' among the text stored in the database within a predetermined time interval from the time point of the user's utterance and to display the searched text in the query list 182. Therefore, a message saying "Do you want to search for the words starting with 'G'?" may be displayed on the guide screen 185. In this case, if the user says "yes", the query list 182 illustrated in FIG. 23(a) can be displayed.

Therefore, the controller 160 can carry out searching for the text selected from among the text displayed in the query list 182 through the search server 20. In this case, the user may utter one of the displayed text or select the text by using a cursor 201.

Figure 24:
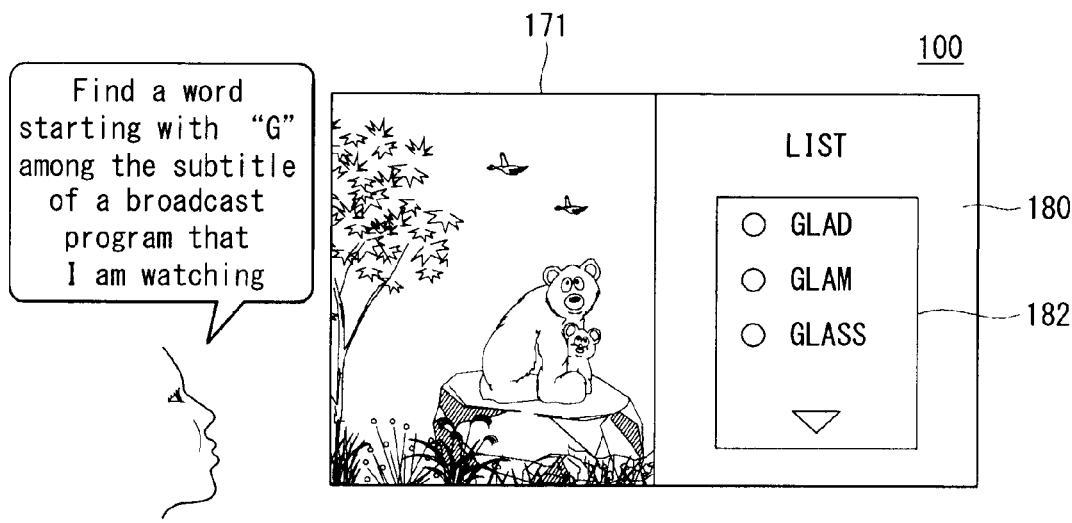

FIG. 24 illustrates a case where the text corresponding to a user command received in the voice recognition mode is displayed according to a program. According to FIG. 24, the controller 160 can search the database for the text associated with a program displayed on the display unit 171 and display the searched text. In this case, the controller 160 can store in the database the displayed text and information about a broadcast channel through which the corresponding text has been displayed, a program title, and so on.

More specifically, with reference to FIG. 24, while the display device 100 is in the voice recognition mode, the user may utter "Find a word starting with 'G' among the subtitle of a broadcast program that I am watching". In this case the controller 160 searches the database for the information about the broadcast program currently displayed from among the broadcast information stored in the database and extracts the information about the broadcast program currently displayed, and displays a word starting with 'G' from among the extracted information.

In this case, the controller 160 can display the text in a query list 182 in the order of weight. Afterwards, as described above, the controller 160 can increase the weight associated with the selected one text.

Therefore, the controller 160 can carry out a search for the text selected among the text displayed in the query list 182 through the search server 20.

Meanwhile, FIGS. 25 to 30 illustrate various guides provided in the voice recognition mode.

Figure 25:
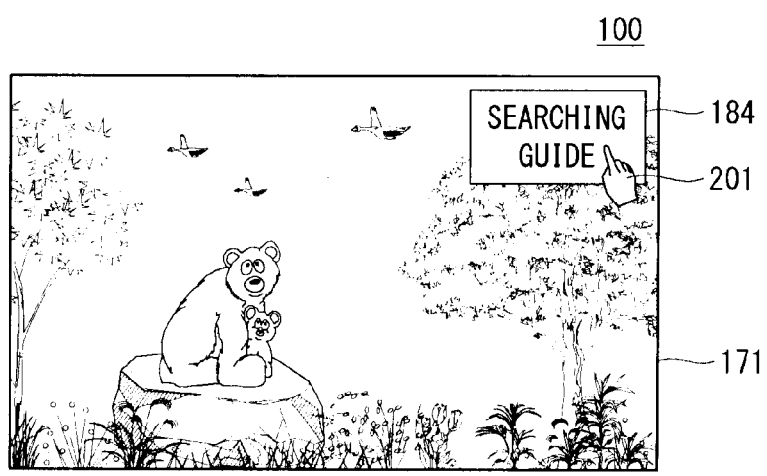

With reference to FIG. 25, a guide button 184 can be displayed in the voice recognition mode. In this case, the guide button 184 may be used to display a guide screen 185 allowing the user to carry out a search by using the user's voice in the voice recognition mode.

Figure 26:
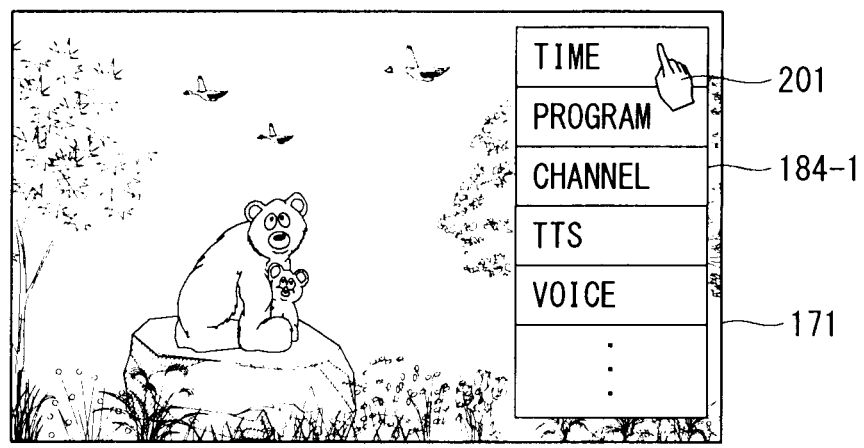

Meanwhile, if the user positions a cursor 201 on the displayed guide button 184 or selects the guide button 184 by using the cursor 201, a guide list 184-1 as shown in FIG. 26 can be displayed.

The "TIME" button from among the guide list 184-1 of FIG. 26 can be selected to extract and display the text displayed within a predetermined time interval from the current time point.

Figure 27:
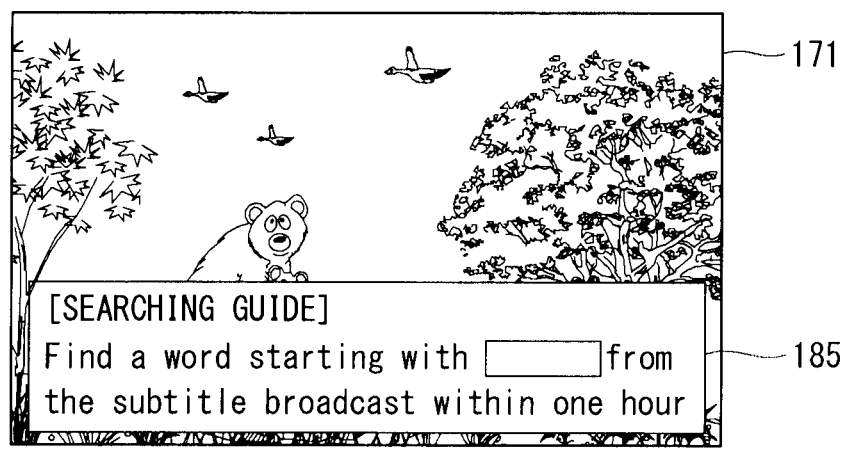

If the "TIME" button is selected, a guide screen 185 such as shown in FIG. 27 can be displayed. Therefore, the user can command the display device 100 by referring to the guide screen 185. For example, the user may utter "Find a word starting with "G" from the subtitle broadcast within one hour". Subsequent operation is the same as described with reference to FIG. 23.

In addition, while the guide screen 185 such as shown in FIG. 27 is displayed, the user can utter only the text that he or she want to search for. In other words, in the guide screen 185, displayed is a guide message saying "Find a word starting with _____ from the subtitle broadcast within one hour". Therefore, in case the user wants to find a word starting with "G", the user only has to pronounce "G".

Meanwhile, the "CHANNEL" button among the guide list 184-1 of FIG. 26 can be selected to extract and display the text which has been displayed in a particular channel. In this case, the controller 160 can store channel information received from the broadcast station 10 into the database along with the text displayed on the screen.

If the "CHANNEL" button is selected, a guide message saying "Find a word starting with _____ from the subtitle broadcast in _____ channel" can be displayed. Therefore, the user can command the display device 100 by referring to the guide screen 185. For example, the user may utter "Find a word starting with 'G' from the subtitle broadcast in the 123 channel". In addition, the user may utter "123" and "G" only.

Therefore, the controller 160 can search the database for the text corresponding to the received voice of the user "123" and "G" and display the searched text. Afterwards, if text starting with "G" is displayed in the query list 182, the controller 160 can carry out a search through the search server 20 with respect to the selected text from among the displayed text.

Meanwhile, the "TTS" button among the guide list 184-1 of FIG. 26 can be selected to convert displayed text to a voice or a sound (text to speech).

Figure 28:
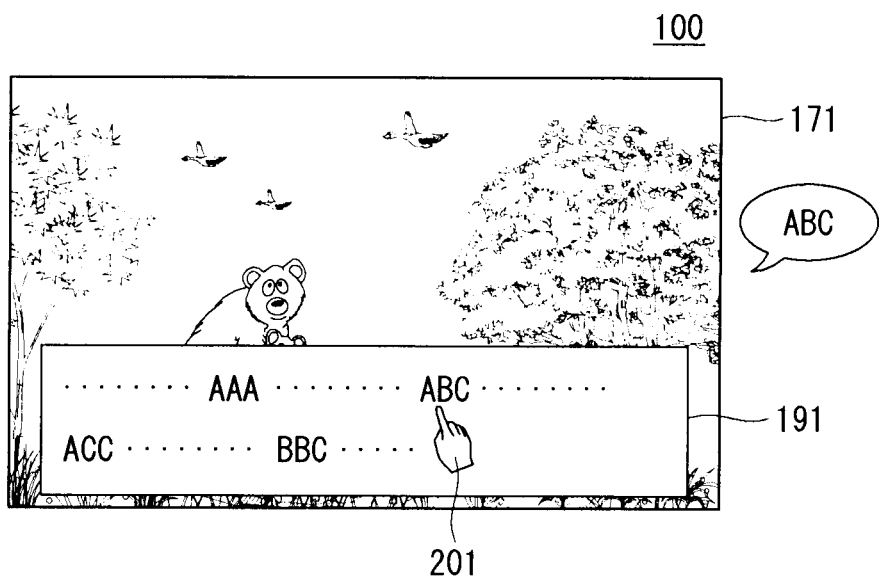

If the "TTS" button is selected, a subtitle 191 as shown in FIG. 28 can be displayed, and the user can select the text to search within the displayed subtitle 191 by using a cursor 201. For example, if the user wants to search for "ABC", the user may position the cursor 201 at "ABC" among the displayed subtitle 191 or select the "ABC". In this case, the controller 160 can output the text "ABC" as a converted sound "ABC" through the sound output unit 172.

Therefore, the controller 160 may carry out a search by using the produced sound "ABC" as a query.

Meanwhile, the "PROGRAM" button among the guide list 184-1 of FIG. 26 can be selected to extract and display the text which has been displayed in a particular program. In this case, the controller 160 can store the program information received from the broadcast station 10 in the database along with the text displayed on the screen.

If the "PROGRAM" button is selected, displayed on the guide screen 185 can be a message saying "Find a word starting with _____ from the subtitle broadcast in the _____ program". Therefore, the user can command the display device 100 by referring to the guide screen 185. For example, the user can say "Find a word starting with 'G' from the subtitle broadcast in the 123 program". In addition, the user may utter "123" and "G" only.

Therefore, the controller 160 can search the database for the text corresponding to the received voice of the user "123" and "G" and display the searched text. Afterwards, if text starting with "G" is displayed in the query list 182, the controller 160 can carry out a search through the search server 20 with respect to the selected text from among the displayed text.

Figure 29:
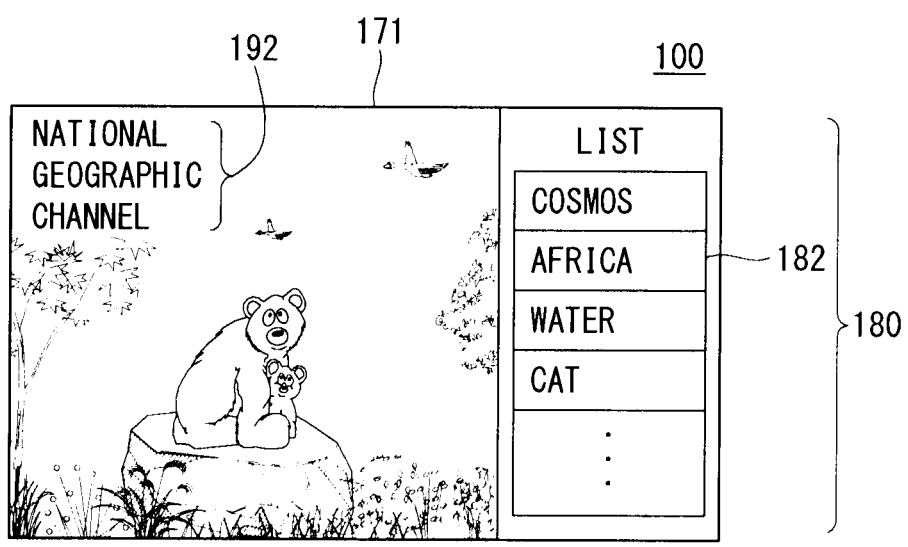

In addition, the controller 160 can detect the title of the broadcast program displayed on one side of the screen and store the detected title into the database along with the displayed text. More specifically, as shown in FIG. 29, since the broadcast program logo 192, channel name, and program title are being displayed, the controller 160 can store the displayed text into the database along with the program logo 192, channel name, and program title displayed on the screen.

Next, if the "PROGRAM" button or the "CHANNEL" button is selected among the guide list 184-1, the controller 160 can detect the broadcasting company logo 192, channel name, and program title; and extract the corresponding information from the database. Therefore, the controller 160 can extract text corresponding to the currently displayed broadcasting company logo 192, channel name, and program title from among the text stored in the database. And the controller 160 can display the extracted text in the query list 182.

In this case, the controller 160 can display the extracted text in the query list 182 in the order of weight. In addition, the controller 160 may display the extracted text in the query list 182 in the order of last entry into the database.

Meanwhile, the "VOICE" button among the guide list 184-1 of FIG. 26 can be selected to display text or a query to be searched through the user's voice.

After the "VOICE" button is selected, the user can utter an inquiry about information of a currently broadcast program. The controller 160 can extract text corresponding to the user's utterance from the database.

For example, as shown in FIG. 30(*a*), while the display device 100 is in the voice recognition mode, the user can utter "G". Then the controller 10 can recognize the text corresponding to the user's utterance as a command to search the database. Preferably, the controller 160 searches the database for the text starting with the user's utterance and recognizes the search result as a command displayed in the query list 182.

Therefore, displayed on the guide screen 185 can be a message saying "Are you looking for 'GLAD'?" In this case, if the user utters "yes", the controller 160 receives a search result based on the query 'GLAD' from the search server 20 and displays the search result.

However, if the user utters "no", the controller 160 may display in the query list 182 the remaining text except for 'GLAD' from among the text stored in the database. Therefore, the controller 160 can carry out a search through the search server 20 for the text selected from among the text displayed in the query list 182. In this case the user may utter text corresponding to one of the displayed text or select a query by using the cursor 201.

Also, as shown in FIG. 30(*b*), while the display device 100 is in the voice recognition mode, the user may utter "Who's starring?" Then the controller 160 searches the database for actor information of a program currently displayed.

In this case, program information can be stored in the database along with displayed text. EPG information received from the broadcast information 10 includes the program information comprising various types of information such as cast member information, broadcast time information, and producer information. Therefore the controller 160 can search the EPG information for cast member information and display the searched information. Also, as described above, displayed text can be stored in the database. In this case, since actor information can be displayed as text through a subtitle, the actor information displayed can be stored in the database as text. Therefore, the controller 160 may search for text corresponding to the actor information stored in the database and display the searched text.

Figure 31:
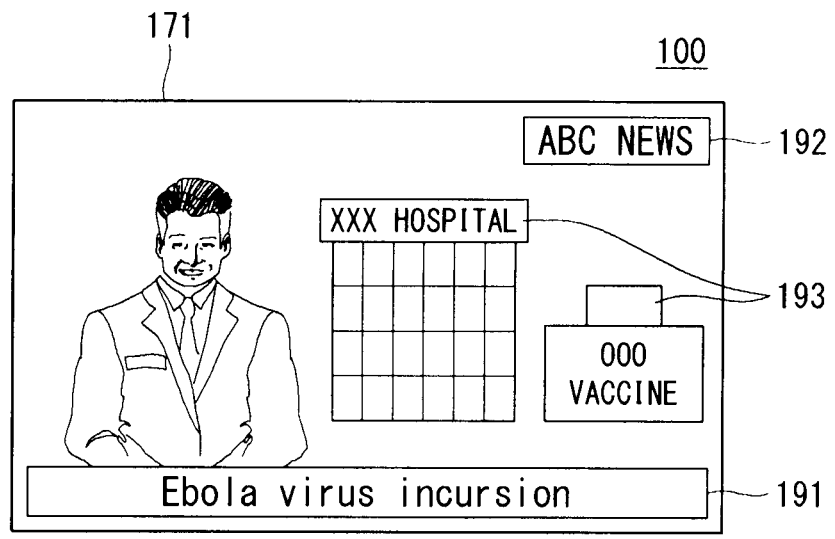
FIGS. 31 to 33 illustrate a display device according to various embodiments of the present invention.
Figure 32:
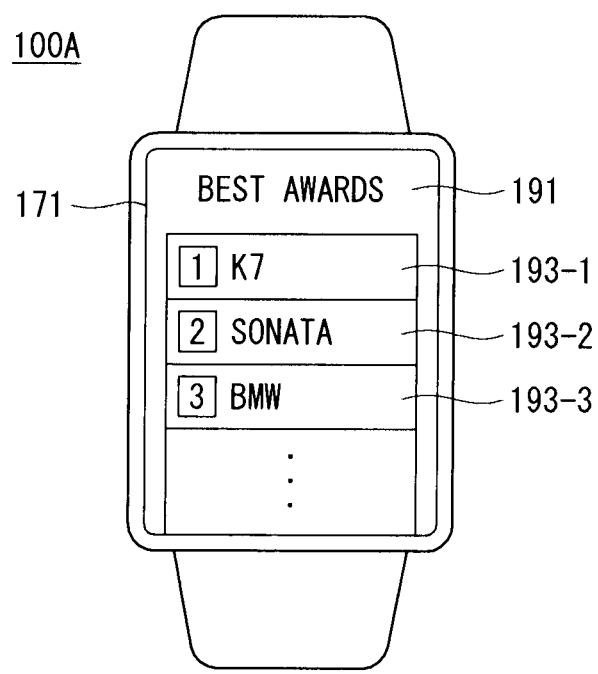
Figure 33:
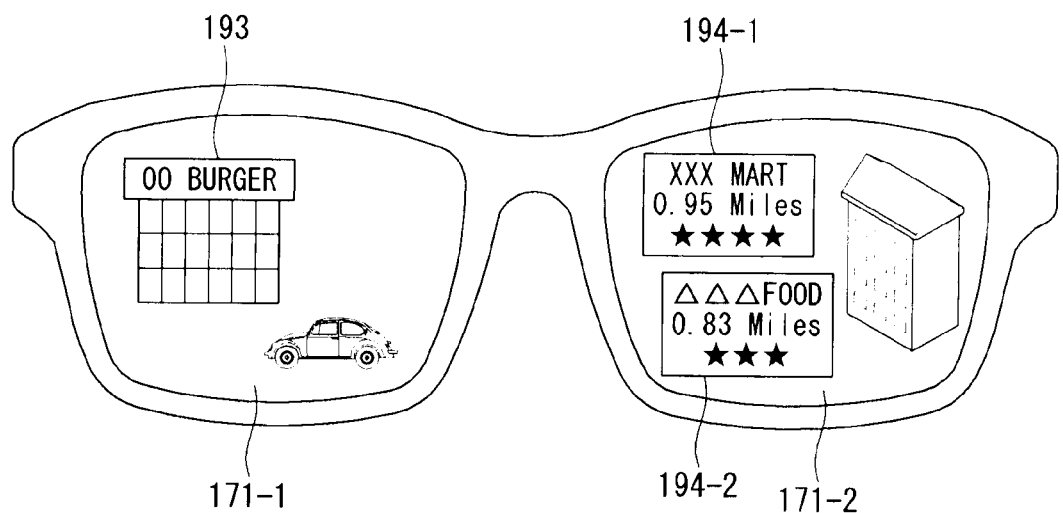

FIGS. 31 to 33 illustrate a display device 100 according to various embodiments of the present invention. In what follows, those parts repeating the previous descriptions will be omitted.

FIG. 31 illustrates a case where the display device 100 implemented as TV displays a broadcast program.

As shown in FIG. 31, the display unit 171 can display text. At this time, text consists of characters, numbers, and symbols to represent information, examples of which can include a subtitle 191 and a broadcast logo 192 among the data included in a broadcast signal.

Also, the display unit 171 may display a text image 193. Here, a text image 193 denotes an image representing text, which is displayed by executing an image file rather than a text file. For example, the image capturing text in a broadcast screen of FIG. 31 can be a text image 193.

Meanwhile, the controller 160 converts the displayed text image 193 into text and stores the text into the database. At this time, since a method for converting the text image 193, which is an image file, into a text file is well known, detailed descriptions of the method will not be given.

Meanwhile, although FIG. 31 illustrates only the case where a broadcast program is displayed, the present invention is not limited to the case above. In other words, the descriptions above can also be applied to the case where a web browser is executed or the case where contents such as movie or video stored in the storage unit 120 is played.

Meanwhile, although FIG. 31 illustrates a display device 100 implemented as TV, the present invention is not limited to the above. In other words, the present invention can be implemented by a mobile terminal (not shown) of a smart phone type, and moreover, the present invention can be implemented by a smart watch 100A as shown in FIG. 32.

In addition, the present invention can be implemented by a smart glass 100B. FIG. 33 illustrates a case where a text image 193 is displayed in a first display unit 171-1. In other words, a camera (not shown) formed in one side of an external frame of a smart glass 100B can capture the surroundings of the camera, and a captured image can be displayed in the first display unit 171-1. In this case, the captured image may include a text image 193 and such a text image can be stored in the database after being converted into text.

Meanwhile, FIG. 33 illustrates a case where an image different from the image displayed in the first display unit 171-1 is displayed in a second display unit 171-2. For example, an augmented reality image 194-1, 194-2 can be displayed in the second display unit 171-2, and such an augmented image 194-1, 194-2 may include a text image.

As described above, the controller 160 can update the database by increasing a weight associated with various kinds of text or text converted from a text image as shown in FIGS. 31 to 33. Accordingly, the controller 160 performs voice recognition according to the database reflecting the weight, achieving an advantageous effect of improving a success rate of voice recognition with respect to a user. In addition, a function-limited device such as a smart phone, smart watch, or smart glass can also be employed to conveniently carry out a search.

The present invention can be implemented in the form of computer-readable code in a recording medium storing program. Computer-readable recording medium includes all kinds of recording apparatus which stores data that a computer system can read. Examples of a computer-readable recording medium include Hard Disk Drive (HDD), Solid State Disk (SSD), Silicon Disk Drive (SDD), ROM, RAM, CD-ROM, magnetic tape, floppy disk, and optical data storage device. The present invention can also be implemented in the form of carrier waves (for example, transfer through the Internet). Also, the computer may include the controller 160 of the mobile terminal. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

What is claimed is:

1. A display device, comprising:
a display;
a sound sensor;
a network interface for communicating with a voice recognition server;
a database; and
a controller configured to:
display, on the display, a content including text,
extract the text from in the displayed content,
store the extracted text and a weight of the extracted text in the database for a predetermined time period,
update the database by increasing the weight to the stored text when a user's voice corresponding to the stored text is received within the predetermined time period through the sound sensor,
update the database by decreasing the weight to the stored text when the user's voice corresponding to the stored text is not received within the predetermined time period through the sound sensor,
calculate a first matching score representing a degree of matching between the user's voice and the stored text and a second matching score between the user's voice and text stored in the voice recognition server,
select the text corresponding to a higher score among the first matching score reflecting the weight and the second matching score, and
display, on the display, the selected text,
wherein the controller is configured to communicate with a search server via the network interface, and transmit text selected from among at least one displayed text to the search server and to receive a search result corresponding to the transmitted text from the search server and to display the received search result.

2. The display device of claim 1, wherein the display is configured to display an image corresponding to a broadcast signal, and the controller is configured to store text in the database in case an image with the text is displayed on the display.

3. The display device of claim 1, wherein the controller is configured to update the database by increasing the weight for selected text.

4. The display device of claim 1, wherein the controller is configured to update the database in a voice recognition mode.

5. The display device of claim 1, wherein the controller is configured to extract a word or a sentence from the displayed text and to store the extracted word into a first database or the extracted sentence to a second database.

6. The display device of claim 1, wherein the controller is configured to reduce a weight for the text stored in the database after a predetermined time period.

7. The display device of claim 1, wherein the controller is configured to delete the text corresponding to a weight below a predetermined threshold from the database.

8. The display device of claim 1, wherein the controller is configured to identify a user who performs voice recognition and to update a database formed separately according to the identified user.

9. The display device of claim 1, wherein the controller is configured to increase a weight corresponding to the extracted text.

10. The display device of claim 1, wherein, in case selected text provides the maximum score among the database, the controller is configured to increase a weight for the selected text.

11. The display device of claim 1, wherein the controller is configured to extract at least one text according to the order of last entry into the database and to display the extracted text on the display.

12. The display device of claim 1, wherein the controller is configured to extract text associated with a program displayed on the display from the database and displays the extracted text.

13. The display device of claim 1, wherein the controller is configured to display on the display a guide screen for selecting text corresponding to the user's voice received.

14. The display device of claim 1, further comprising a sound output unit, wherein, if a cursor is located at the displayed text, the controller is configured to convert the text at which the cursor is located into a sound and to output the sound through the sound output unit.

15. The display device of claim 1, wherein the controller is configured to display the at least one text extracted on the display.

16. The display device of claim 1, wherein the display device is one of a TV, a smart phone, a smart glass, and a smart watch.

17. A control method for a display device, comprising:
displaying a content including text on a display;
extracting the text from in the displayed content;
storing the extracted text and a weight of the extracted text in a database for a predetermined time period;
updating the database by increasing the weight to the stored text when a user's voice corresponding to the stored text is received within the predetermined time period through a sound sensor;
updating the database by decreasing the weight to the stored text when the user's voice corresponding to the stored text is not received within the predetermined time period through the sound sensor;
calculating a first matching score representing a degree of matching between the user's voice and the stored text and a second matching score between the user's voice and text stored in a voice recognition server,
selecting the text corresponding to a higher score among the first matching score reflecting the weight and the second matching score, and
displaying the selected text on the display,
wherein the controller is configured to communicate with a search server via the network interface, and transmit text selected from among at least one displayed text to the search server and to receive a search result corresponding to the transmitted text from the search server and to display the received search result.

* * * * *